United States Patent
King et al.

(10) Patent No.: US 7,827,069 B2
(45) Date of Patent: Nov. 2, 2010

(54) METHOD AND SYSTEM FOR REGISTERING POTENTIAL ACQUIRERS OF VEHICLES THAT ARE NOT CURRENTLY ON THE MARKET

(75) Inventors: Martin T. King, Vashon Island, WA (US); Henry Happel, Seattle, WA (US); Jerald Gnuschke, Woodinville, WA (US); James Q. Stafford-Fraser, Cambridge (GB)

(73) Assignee: Second and Main LLC, Seattle, WA (US)

( * ) Notice: Subject to any disclaimer, the term of this patent is extended or adjusted under 35 U.S.C. 154(b) by 0 days.

(21) Appl. No.: 11/501,681

(22) Filed: Aug. 8, 2006

(65) Prior Publication Data
US 2007/0162347 A1 Jul. 12, 2007

Related U.S. Application Data

(63) Continuation-in-part of application No. 11/113,364, filed on Apr. 22, 2005.

(60) Provisional application No. 60/647,353, filed on Jan. 25, 2005.

(51) Int. Cl.
G06Q 30/00 (2006.01)
(52) U.S. Cl. .............................. 705/26; 705/4; 705/27; 701/27
(58) Field of Classification Search ................... 705/37, 705/4, 28; 379/71; 364/401
See application file for complete search history.

(56) References Cited

U.S. PATENT DOCUMENTS

| | | | |
|---|---|---|---|
| 5,922,040 A * | 7/1999 | Prabhakaran | 701/117 |
| 6,263,322 B1 * | 7/2001 | Kirkevold et al. | 705/400 |
| 6,385,541 B1 | 5/2002 | Blumberg et al. | |
| 6,397,208 B1 | 5/2002 | Lee | |
| 6,636,803 B1 | 10/2003 | Hartz, Jr. et al. | |
| 6,751,596 B1 | 6/2004 | Hastings | |
| 6,871,140 B1 * | 3/2005 | Florance et al. | 701/207 |
| 6,975,997 B1 * | 12/2005 | Murakami et al. | 705/5 |
| 7,076,452 B2 | 7/2006 | Florance et al. | |

(Continued)

FOREIGN PATENT DOCUMENTS

EP 1943480 7/2008

(Continued)

OTHER PUBLICATIONS

Jill Burdett, How to buy a house that's not for sale, Mar. 5, 2003, Manchester Evening News (Manchester).*

(Continued)

*Primary Examiner*—Ella Colbert
*Assistant Examiner*—Chika Ojiaku
(74) *Attorney, Agent, or Firm*—Perkins Coie LLP

(57) ABSTRACT

A register interest system receives from a potential acquirer of assets an indication that the potential acquirer is interested in acquiring rights in a specific asset that is not currently on the market. The register interest system stores indications that the potential acquirers are interested in specific assets. When a notification criterion has been satisfied, then the register interest system notifies the owner of the specific asset that one or more potential acquirers are interested in acquiring rights to that asset. The owner and a potential acquirer can then negotiate the purchase of the rights.

11 Claims, 22 Drawing Sheets

U.S. PATENT DOCUMENTS

| | | | |
|---|---|---|---|
| 7,243,099 B2* | 7/2007 | Lokken | 707/5 |
| 7,246,046 B2* | 7/2007 | Coakley | 703/2 |
| 7,254,559 B2 | 8/2007 | Florance et al. | |
| 7,392,209 B2* | 6/2008 | Shike et al. | 705/27 |
| 2001/0049647 A1 | 12/2001 | Sheehan et al. | |
| 2002/0072930 A1 | 6/2002 | Scites | |
| 2002/0091703 A1 | 7/2002 | Bayles | |
| 2002/0097827 A1 | 7/2002 | Aoki et al. | |
| 2002/0161657 A1* | 10/2002 | Kojac et al. | 705/26 |
| 2003/0004861 A1 | 1/2003 | Amend et al. | |
| 2003/0064705 A1 | 4/2003 | Desiderio | |
| 2003/0130924 A1 | 7/2003 | Muldrow et al. | |
| 2004/0030616 A1* | 2/2004 | Florance et al. | 705/27 |
| 2004/0030631 A1* | 2/2004 | Brown et al. | 705/37 |
| 2004/0111358 A1 | 6/2004 | Lange et al. | |
| 2004/0128215 A1 | 7/2004 | Florance et al. | |
| 2004/0167798 A1* | 8/2004 | Hastings | 705/1 |
| 2004/0220816 A1* | 11/2004 | Brush | 705/1 |
| 2004/0220823 A1* | 11/2004 | Brush et al. | 705/1 |
| 2005/0010423 A1* | 1/2005 | Bagbey et al. | 705/1 |
| 2006/0167710 A1 | 7/2006 | King et al. | |
| 2006/0195428 A1* | 8/2006 | Peckover | 707/3 |
| 2007/0136163 A1* | 6/2007 | Bell | 705/35 |

FOREIGN PATENT DOCUMENTS

| | | |
|---|---|---|
| EP | 1943598 | 7/2008 |

OTHER PUBLICATIONS

Stevenky, How to Buy a House that Isn't for Sale—www.ehow.com (Nt4Sale).*

Amy Wimmer, St Petersburg Times Online Tampa Bay, Buyer appears for homes not on market, Mar. 26, 2003, (Buyers Appear).* http://autocollections.com/index.cfm?action=inventory &tab=ondisplay 2007, (Display).*

Insurance Information Institute, Your Home Inventory (home Inventory).*

International Search Report and Written Opinion, International Application No. PCT/US2006/00255, mailed Aug. 17, 2007, 10 pages.

Sim, Marcel "Igglo," http://www.coolbusinessideas.com/archives/igglo.html, accessed Dec. 10, 2008, 10 pages.

"Igglo Overview," http://www.tradevibes.com/company/profile/igglo?search=simple, accessed Dec. 10, 2008, 5 pages.

Wikipedia, the free encyclopedia "Igglo," http://en.wikipedia.org/w/index.php?title=Igglo&printable=yes, accessed Dec. 10, 2008, 2 pages.

Igglo "Igglo: Uusi tapa tehda asuntokauppaa. Loyda unelmakotisi ja sopiva ostaja asunnollesi Osta, myy ja vuokraa asuntoja. Igglo," http://www.igglo.fi/, accessed Dec. 10, 2008 2 pages.

Forbes.com "Thomson Financial News—Sanoma buys real estate Web portal Igglo," http://www.forbes.com/afxnewslimited/feeds/afx/2008/09/09/afx5403022.html, accessed Dec. 10, 2008, 5 pages.

Burslem, Joel, "Sign of the Times? Igglo Melts Away," Future of Real Estate Marketing, http://www.futureofrealestatemarketing.com/?s=Igglo, accessed Dec. 10, 2008 11 pages.

"Real estae 3.0: selling houses that aren't for sale," http://www.springwise.com/homes_housing/real_estate_30/, accessed on Dec. 10, 2008, 3 pages.

Virtual Economics, "Zillow is the new Igglo," http://virtualeconomics.typepad.com/virtualeconomics/2006/12/zillow_is_the_n.html, accessed Dec. 10, 2008, 1 page.

Antique Mercantile. "Want List." www.pcis.net/antiquemerc/wantlist.htm, accessed Aug. 29, 2005, 2 pages.

Antiques and Collectible Exchange, The. "The Want List." http://antiques.tace.com/want_list/about.html, accessed Aug. 29, 2005, 1 page.

Bowers and Merena Austions. "Our Mission Statement." www.bowersandmerena.com/aboutbowersandmerena.chtml, Aug. 29, 2005, 3 pages.

Hymer, Dian. "Unlisted Homes Come at a Price." Do It Yourself.com. http://doityourself.com/resale/unlistedhomes.htm, accessed Aug. 29, 2005, 3 pages.

MyHousePrice.com. Homepage. www.myhouseprice.com, accessed Aug. 29, 2005, 1 page.

Philadelphia Print Shop Ltd., The. "Looking for an Antique Print, Map or Related Book?" http://www.philaprintshop.com/looking4.html, accessed Aug. 29, 2005, 4 pages.

Pin Services Ltd. Request page. www.pin.ca/contact/buyer.html, accessed Aug. 29, 2005, 14 pages.

Sharoff, Robert. "So You Want to Sell to a Millionaire?" Realtor Magazine Online, Feb. 1, 2001. http://www.realtor.org/rmomag.nsf/pages/SoyouwanttRobArchive2000Feb, accessed Aug. 29, 2005, 7 pages.

UKBookworld.com. Homepage. www.ukbookworld.com, accessed Aug. 29, 2005, 1 page.

* cited by examiner

Register Interest Service

You have registered an interest in

| Address | City | State | Zip | |
|---|---|---|---|---|
| 123 Main Street | Seattle | WA | | 401 |
| 476 A Street | Seattle | WA | | 402 |

⋮

Select a house to see detailed information.

Register Interest Service

Mr. Homeowner,

Thanks for visiting the Register Interest Service . . .

To find out about the potential buyers interested in your house, please register with the Register Interest Service.

Register Vehicle Interest Service

Register your interest in a vehicle

Enter License Plate Number _____ ~ 1801

Select State [ alabama ▼ ] ~ 1802

1803
( Submit )

*FIG. 18*

Register Vehicle Interest Service

Your interest in

License Plate Number _____ ~ 1901

State _____ ~ 1902

Make _____ ~ 1903

Model _____ ~ 1904

Year _____ ~ 1905 is about to be registered.

Do you accept the following terms? 1906

1907 ( accept )  1908 ( reject )  1909 ( wrong vehicle )

*FIG. 19*

Register Vehicle Interest Service

We could not locate the vehicle with

License Plate Number  _____

State  _____  ～ 2001

Please enter description of vehicle to locate dealers or private parties with similar vehicles in your area Make  _____  ⎫
Model _____  ⎬ 2002
Year  _____  ⎭

· · ·    2003              2004              2005

( locate dealers )   ( locate private parties )   ( locate both )

*FIG. 20*

METHOD AND SYSTEM FOR REGISTERING POTENTIAL ACQUIRERS OF VEHICLES THAT ARE NOT CURRENTLY ON THE MARKET

CROSS-REFERENCE TO RELATED APPLICATION(S)

This application is a continuation-in-part of U.S. patent application Ser. No. 11/113,364 filed on Apr. 22, 2005, entitled "METHOD AND SYSTEM FOR REGISTERING POTENTIAL ACQUIRERS OF ASSETS THAT ARE NOT CURRENTLY ON THE MARKET," which claims the benefit of U.S. Provisional Application No. 60/647,353 filed on Jan. 25, 2005, entitled "SYSTEM AND METHOD FOR PREMARKETING HIGH VALUE ASSETS," which are hereby incorporated by reference.

BACKGROUND

Currently, assets such as residential real estate properties are typically sold from a seller to a buyer who are each represented by their own real estate agents. When a seller wants to sell their house, the seller elicits the services of a sellers' agent who markets the house and assists in the pricing of the house and in the negotiating of final purchase price. To market a house, the sellers' agent may list the house using a multiple listing service ("MLS") that advertises the house to other real estate agents. A buyer who is interested in buying a house elicits the services of a buyers' agent who helps the buyer locate a house of interest and assists in the negotiating of the final purchase price. The buyers' agent shows the buyer the current inventory of houses that are for sale that may be of interest to the buyer. Assuming that a house of interest is currently for sale, then the buyer and the seller of the house negotiate a purchase price with the help of their agents. Upon completion of the sale, the seller may pay the sellers' agent a percentage of the purchase price as a commission. The sellers' agent may then share the commission with the buyers' agent.

Assets other than residential real estate may be sold using different marketing models. For example, fine art (e.g., a master's painting) may be sold at an auction conducted by an auction house. When the owner of the art wants to sell, the owner elicits the services of an auction house to advertise and conduct the auction for the art. The auction house may provide an appraisal for the art, contact potential buyers of the art, advertise the auction, conduct the auction, and coordinate the transfer of ownership from the seller to the winning bidder at the auction. The auction house may take as its fee a percentage of the winning bid price.

When a potential buyer is unable to locate an asset in which the potential buyer is interested, the potential buyer may advertise their interest in an asset with certain characteristics. For example, when a potential buyer wants to buy a certain type of antique automobile, that buyer may place a "want advertisement" in an antique automobile magazine. The advertisement may include a description of the automobile that is wanted, and the price that the potential buyer is willing to pay. An owner of an automobile that matches the description who is interested in selling can contact the potential buyer and negotiate the sale of the automobile. Although want advertisements can be effective for assets that can be described in a fairly objective way (e.g., a 1965 Mustang convertible like new), they are not as effective for assets that may have a fairly subjective component to their description (e.g., three-bedroom house with a nice view in a nice neighborhood).

The current models such as those described above for selling assets have various limitations. For example, a potential buyer of a house is typically limited to those houses that are currently being offered for sale. If none of the houses satisfy what the potential buyer is looking for in a house, then the potential buyer may buy a house that does not satisfy their needs or may become frustrated and simply not buy a house. It is very common, however, for people to notice and make mental note of houses they see which they would be interested in buying if available for sale. The knowledge that a person is interested in buying a house has economic value to the person and to the owner, which is currently not being captured. As another example, a potential buyer of fine art may not be able to buy art of interest that is not currently on the market, even though the owner would sell the art if the owner knew there was significant interest by potential buyers. It would be desirable to have a model for selling assets that would overcome these and other limitations and capture the economic value for the knowledge that people are interested in buying an asset that is not currently for sale.

BRIEF DESCRIPTION OF THE DRAWINGS

FIG. 4 is a display page that allows a potential buyer to view the list of houses in which the potential buyer has registered an interest in one embodiment.

FIG. 8 is a display page provided to an owner when the owner visits the register interest system after being notified of potential buyers' interest in one embodiment.

FIG. 18 is a display page that allows a potential buyer to identify a vehicle in which the potential buyer wants to register an interest in one embodiment.

FIG. 19 is a display page that provides detailed information about a vehicle and allows a potential buyer to register an interest in one embodiment.

FIG. 20 is a display page that helps the potential buyer locate a vehicle of interest if detailed information on the uniquely identified vehicle cannot be located in one embodiment.

DETAILED DESCRIPTION

Figure 1:
FIG. 1 is a display page that allows a potential buyer to select various options of the register interest system in one embodiment.

A method and system for registering potential acquirers who are interested in acquiring rights in assets that are not currently on the market is provided. In one embodiment, a register interest service provides a register interest system that receives from a potential acquirer of assets an indication that the potential acquirer is interested in acquiring rights in a specific asset that is not currently on the market. For example, if the asset is a house, then a potential buyer may register their interest in a specific house (e.g., at 123 Main St.) that is not currently being offered for sale. The register interest system stores indications that the potential acquirers are interested in specific assets. For example, the register interest system may store a mapping from a house address to the names of the potential buyers that are interested in the house at that address. When a notification criterion has been satisfied, then the register interest system notifies the owner of the specific asset that one or more potential acquirers are interested in buying rights to that asset. For example, when a certain number of potential buyers have registered an interest in a certain house, then the register interest system may send a notification to or direct that a notification be sent to the owner indicating that potential buyers have expressed an interest in buying the house. If the potential acquirers and the owners of assets agree to terms of the register interest service, then the register interest system directs that the owner and potential acquirers be put in contact. The terms may be that a potential acquirer, an actual acquirer, or the owner may pay a fee (e.g., a percentage of the acquisition price) to the register interest service. In this way, potential acquirers of a specific asset not need wait until the asset is put on the market to express their interest, and owners of assets that are not currently on the market can be notified of potential acquirers. One skilled in the art will appreciate that the register interest system can be used to register an interest in various types of assets such as fine art, antiques, yachts, cars, horses, show dogs, commercial and residential real estate, and so on.

In one embodiment, the register interest system is used to generate interest in a transaction between a potential buyer and the owner of real estate property that is not currently for sale. The register interest system provides a web site through which potential buyers of real estate property can register their interest in a specific real estate property (e.g., house) that is not currently for sale. The register interest system may provide a web page for registering an interest in real estate property. The register interest system may allow a potential buyer to identify a house by its street address, by selecting the lot on which the house resides from a map, and so on. The register interest system maintains a mapping of the houses to the potential buyers that have registered an interest in those houses. The register interest system may also collect information from the potential buyers so that it can assess whether a potential buyer has the financial capability to buy the house. This assessment may be similar to the prequalification of potential buyers performed by lending institutions when a potential buyer first starts to look for a house. The register interest system may require a potential buyer to agree to registration terms before their interest is registered. For example, the register interest service may require a potential buyer to pay a certain fee such as a fixed fee at the time of registration or a percentage of the purchase price of the house, which may be taken out of the buyers' agent's commission. The register interest system may periodically (or when the owner is about to be notified of the interest) prompt a potential buyer to confirm their continued interest in a house to ensure that their interest is current. Such confirmation may require the potential buyer to pay a continued interest fee to ensure their continued interest. When a sufficient interest in a house has been registered, then the register interest system notifies the owner of the house that potential buyers have registered an interest in the house. For example, the register interest system may notify the owner when a certain number of potential buyers have registered an interest, when a potential buyer has had an interest registered in the house for a certain period, when a comparable house in the same neighborhood is placed on the market or sold, and so on. The register interest system may notify the owner electronically (e.g., assuming that the electronic mail address of the owner is available), may direct that a telephone call be placed to the owner, may direct that a letter be sent to the owner, and so on. The notification may indicate the number of potential buyers that have registered an interest along with an indication of whether it is known that the potential buyers have the financial capability to buy the house. An owner who would not be interested in selling their house if approached by a single potential buyer might be willing to sell their house upon learning that there are many potential buyers. The register interest system may require that the owner agree to terms of the register interest service before the owner is provided any details concerning the registered interest in their house. For example, the registered interest service may require the owner to pay a fee at the time of notification of the number of or names and contact information of the potential buyers who have registered an interest in the owner's house. As another example, the register interest service may require the owner to pay a certain percentage of the actual purchase price of the house when it is sold to one of the potential buyers identified to the owner by the register interest system which may be taken out of the buyer's agent commission or which may be paid by the seller or buyer when no agent is involved in the sale (i.e., contingent fees). When the owner agrees to the terms, then the register interest system identifies one of more of the potential buyers to the owner. The owner and the potential buyer can then negotiate the sale of the house.

In one embodiment, an owner upon receiving notification that potential buyers are interested in buying the owner's house may register with the register interest service. During the registration process, the owner may indicate a price for which the owner would be willing to sell their house. The register interest system can then notify the potential buyers who have a registered interest in the house of the price. A potential buyer could then indicate that they are willing to start negotiating the sale of the house with knowledge of the owner's price.

In one embodiment, the register interest system may provide the contact information of potential buyers to an owner based on a buyer preference criterion. For example, as an incentive for potential buyers to register their interest in houses, the register interest service may have a policy that the first potential buyer to register an interest in the house will be identified to the owner before any other potential buyers are identified. The register interest system may provide a window of opportunity (e.g., seven days) for the potential buyer and owner to agree to terms of the sale of the house. If the potential buyer and the owner do not agree to terms of the sale of the house within that window, then the register interest system can put the owner in contact with the other potential buyers. The register interest system may also base potential buyer preferences on a preference fee paid by a potential buyer. Only potential buyers who are truly interested in buying a house might be willing to pay the preference fee to receive the benefit of the preference. The register interest service may also provide additional information about the potential buyers to the owner with permission of the potential buyers. For example, the register interest system may identify the employer of the potential buyer, indicate whether an offer by the potential buyer would be contingent on the sale of the potential buyer's house, and so on.

In one embodiment, the register interest system may use the registered interest in houses to identify top houses in a neighborhood and to predict a purchase price for a house. Potential buyers may typically register an interest in houses that they find desirable (e.g., because of location, street appeal, number of rooms, and anticipated purchase price). Thus, houses in which a large number of potential buyers have registered an interest may be more likely desirable to potential buyers. The register interest system can use this registration information to identify the most desirable houses in a neighborhood, the most desirable neighborhoods in a city, and so on. In addition, the register interest system may use the registered interest in predicting an actual purchase price for house. The register interest system may assume that a house in which many potential buyers are interested may command a higher purchase price than if no potential buyers register an interest.

In one embodiment, the register interest system may use the registered interest information to help identify comparable houses. A potential buyer who has registered an interest in a house may also want to register an interest in comparable houses. A traditional technique for determining comparable houses might factor in lot size, number of rooms, age of house, location, view, and so on. Such factors are, however, generally objective. A potential buyer who registers interests in multiple houses may do so because the potential buyer believes that the houses are in some way comparable (e.g., similar street appeal or lowest-priced house in a neighborhood). Thus, when a potential buyer registers an interest in the house, the register interest system may identify the other potential buyers who registered an interest in that house and indicate that the other houses in which the potential buyers registered an interest may be comparable. For example, the register interest system may notify a potential buyer that "others who registered an interest in this house also registered an interest in the following houses:." The register interest system may use a combination of traditional techniques and the registered interest information to determine comparable houses that may provide a more accurate assessment of truly comparable houses. For example, if a potential buyer has registered an interest in a six-bedroom house, but the registered interest information indicates that a seven-bedroom, a five-bedroom, and a two-bedroom house may be comparable, then the register interest system may disregard the two-bedroom house because it is outside the traditional technique for determining comparable houses. Similarly, the register interest system may indicate that the seven-bedroom house is more comparable than the five-bedroom house based on the registered interest information. The register interest system may provide a score indicating how comparable a house may be and rank the houses based on their scores.

In one embodiment, the register interest system might use the registered interest information to identify comparable houses that are currently for sale and notify the potential buyer of such houses for a fee. The register interest system may use a combination of traditional techniques and the registered interest information to determine comparable houses that may provide a more accurate assessment of truly comparable houses. For example, the registered interest system may look at historical registered interest information for the house that is for sale to identify the potential buyers who registered an interest in the house and then identify the other houses that those potential buyers also registered an interest.

In one embodiment, the register interest system may make some information on the registration of houses publicly available. The system could compile and publish information on the number of potential buyers who had registered interest in any particular house over time as an indication of the marketability of the house. This indirect information on marketability might influence the behavior of both potential buyers and the owners.

In one embodiment, the register interest system may be used to register interest in vehicles. Such a register vehicle interest system allows potential buyers to register their interest in vehicles such as land vehicles (e.g., automobiles and trucks), water vehicles (e.g., boats and personal watercraft), and air vehicles (e.g., airplanes and helicopters). A potential buyer upon seeing a vehicle of interest may record a unique identifier or some other descriptive information about the vehicle. For example, in the case of a car, the potential buyer may record the license plate number of the car, or in the case of a boat, the potential buyer may record the hull identification number or name of the boat. The potential buyer can then use the register vehicle interest system to register their interest in the specific vehicle having that unique identifier. Upon receiving the unique identifier for the potential buyer, the register vehicle interest system may locate information about that vehicle from a vehicle ID system. For example, a governmental entity that licenses vehicles (e.g., state, province, or country) may provide a database that maps the unique identification of the vehicle to detailed information (e.g., owner name and address and vehicle description). Also, various non-governmental organizations may make comparable information available. For example, a web site providing classified advertising for vehicles that are for sale may maintain a historical database that maps unique identifiers to detailed information. As another example, a vehicle manufacturer may maintain comparable information for vehicle recalls. As another example, the register vehicle interest system may allow vehicle owners to provide comparable detailed information about their vehicles so that they can be notified when a potential buyer registers interest in their vehicles. The vehicle description may include make, model, year, and vehicle identification number. Once the register vehicle interest system has located the detailed information, it may display the detailed information to the potential buyer so that the potential buyer can confirm their interest in the vehicle identified by the detailed information. If the potential buyer indicates to register their interest, then the register vehicle interest system registers the potential buyer's interest in that vehicle in a manner similar to the way a potential buyer's interest in a house is registered as described above. The register vehicle interest system may notify the owner of the vehicle of the potential buyer's interest also in a manner similar to the way an owner of a house is notified as described above. Once the potential buyer and the owner are put in contact by the register vehicle interest system, then they can negotiate for the sale of the vehicle. The register vehicle interest system may charge for its services as described above for registering interest in houses.

In one embodiment, if the register vehicle interest system cannot locate detailed information based on the unique identifier of a vehicle, it may prompt the potential buyer for a description of the vehicle. The description of the vehicle may include its make, model number, color, and year. Upon receiving this description, the register vehicle interest system tries to locate specific vehicles that match this description. For example, the register vehicle interest system may have access to a database that contains listings of vehicles currently in inventory at various vehicle dealers. The register vehicle interest system may search the database for a listing of a vehicle that is comparable to the vehicle described by the potential buyer. As another example, the register vehicle interest system may maintain a database of vehicles whose owners have indicated a willingness to be notified when potential buyers register interest in their vehicle or are offering their vehicles for sale via a classified advertising service. The register vehicle interest system may provide the classified advertising service so that potential buyers can list their current vehicle for sale especially in the case that they have purchased a vehicle after having registered an interest in it. After locating specific vehicles, the register vehicle interest system then displays information describing those vehicles to the potential buyer so that the potential buyer can register their interest in one or more vehicles.

In one embodiment, the register vehicle interest system may access various databases to provide specifications for and history of the vehicles. The specifications of a vehicle may include engine size, vehicle features (e.g., anti-lock braking mechanism), and so on. The register vehicle interest system may access a vehicle specification database provided by the vehicle manufacturer. The history of the vehicles may include maintenance records, accident records, and repair records that can be provided by various vehicle service organizations (e.g., a service department of a vehicle dealership). The specifications and histories may be useful in helping a potential player decide whether to register their interest in a specific vehicle.

In one embodiment, the register vehicle interest system may provide an estimate of the value of a vehicle in which a potential buyer is interested. The register vehicle interest system may estimate the value based on its own database of recent sales for similar vehicles. The register vehicle interest system may also estimate the value based on various commercial estimating services such as the National Automobile Dealers Association ("NADA") Official Used Car Guide or the Kelley Blue Book. The estimated value of a vehicle may help a potential buyer decide whether to register an interest in the vehicle.

In one embodiment, the register vehicle interest system may include advertising on its web pages. The register vehicle interest system can provide very focused and valuable advertising because it knows (1) that the potential buyer is interested in purchasing a vehicle and (2) the specific types of vehicles that are of interest to the potential buyer. In addition, when a potential buyer signs up to use the register vehicle interest system, the system can prompt the buyer for address information so that the advertising can also be focused on the geographic location of the potential buyer. A similar type of advertising model may be used to provide advertisements when a potential buyer registers their interest in any type of asset (e.g., house).

In one embodiment, the register vehicle interest system may allow owners to find out whether any potential buyers have registered an interest in their vehicle. Also, the register vehicle interest system may allow an owner to view whether any potential buyers have registered interest in vehicles comparable to theirs. The register vehicle interest system may allow an owner to indicate that they would like to contact a potential buyer that has registered an interest in a comparable vehicle. The register vehicle interest system may request the potential buyer's permission to be notified of owners who are interested in selling comparable vehicles. The potential buyer may give their permission when registering their interest in a vehicle or give their permission after the register vehicle interest system has notified them that an owner is interested in selling a comparable vehicle.

In general, the register vehicle interest system may integrate many of the features and services as described above for assets in general, and houses in particular. For example, the register vehicle interest system may provide a list of the top 10 types of vehicles in which potential buyers have registered an interest.

FIG. 1 is a display page that allows a potential buyer to select various options of the register interest system in one embodiment. A display page 100 is presented to a potential buyer who has an account with the register interest service. An account may be established by the potential buyer providing information such as their electronic mail address, postal address, name, telephone number, financial information, and so on. The register interest system may provide a user identifier and password so that the potential buyer can be authenticated when logging on to the register interest system. The display page includes a register your interest option 101, a view houses of registered interest option 102, a search for house option 103, and a prequalification option 104. The user selects one of the options and then selects the submit button 105 to perform the selected option. The register your interest option allows a potential buyer to register their interest in any specific house. The view houses of registered interest option allows a potential buyer to view and edit their registered interest in houses. A potential buyer may want to edit their interest, for example, to add comments, to offer a minimum price, or to unregister their interest. The search for house option allows a potential buyer to search for houses that satisfy various criteria. For example, a potential buyer may want to search for all four-bedroom houses within a certain neighborhood to help narrow down houses of interest. The prequalification option allows a potential buyer to, provide their financial information so that the register interest system can assess whether the potential buyer has the financial capability to buy certain houses.

Figure 2:
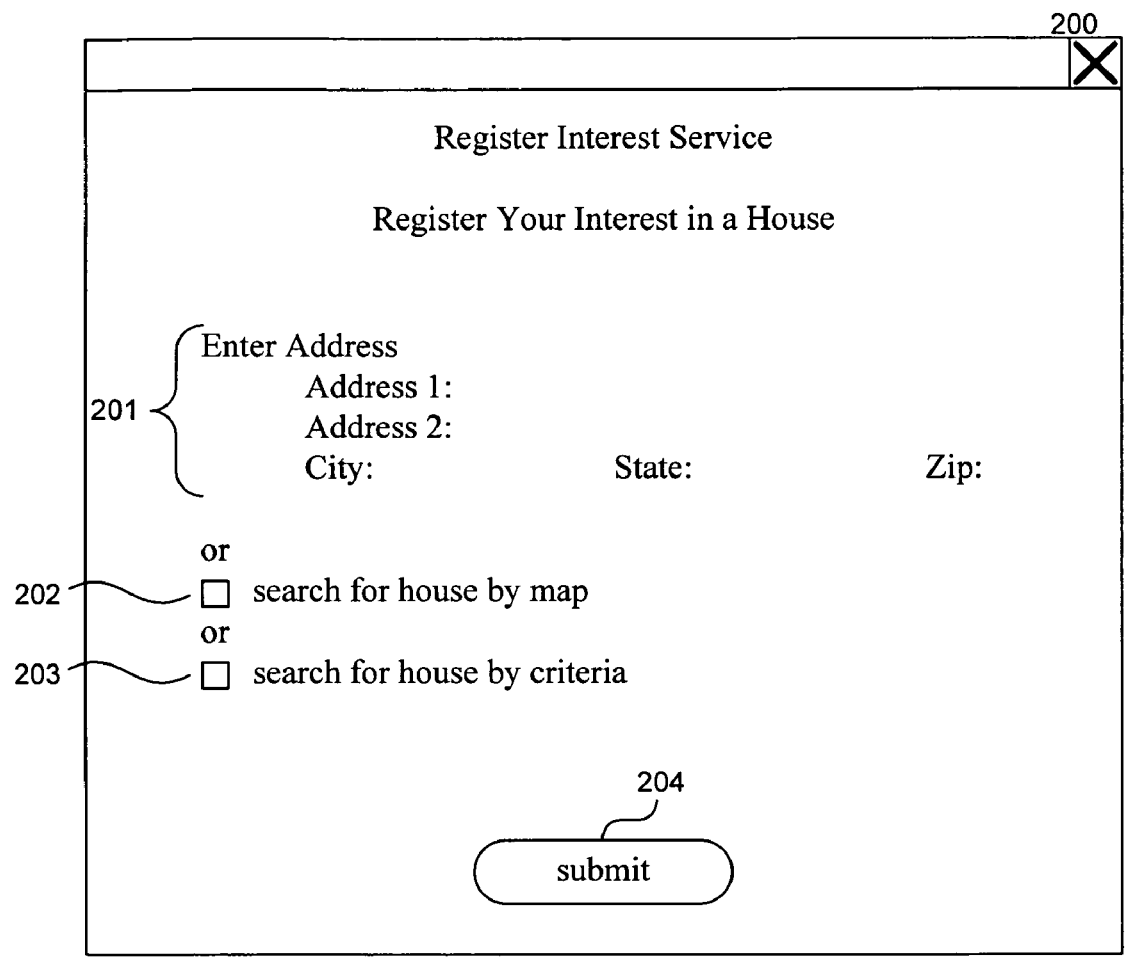
FIG. 2 is a display page that allows a potential buyer to identify a house of interest in one embodiment.

FIG. 2 is a display page that allows a potential buyer to identify a house of interest in one embodiment. A display page 200 includes an address area 201, a search for house by map checkbox 202, and a search for house by criteria checkbox 203. If the potential buyer knows the address of the house of interest, then the potential buyer can input the address in the address area and then select the submit button 204. If the potential buyer is unsure of the address, then the potential buyer can select to either search for the house by map or by criteria by selecting the appropriate checkbox and then the submit button. The search for house by map option allows the potential buyer to view a map of an area and zoom in to a particular property that may be of interest. The register interest system may display information about a selected property, such as lot size, age of house, last sale price, number of bedrooms, and so on. The register interest system identifies the address of the selected property and provides an opportunity for the potential buyer to register an interest in the selected property. The search for house by criteria option allows the potential buyer to enter various criteria of a house such as number of bedrooms and lot size and searches for houses that match those criteria. The potential buyer can then register an interest in one or more houses that match their criteria. The register interest system may also allow a potential buyer to register an interest in houses in an area that meet certain criteria. The area may be designated by neighborhood name, zip code, school district, rectangle on a map, intersection name, and so on. The system may automatically identify houses within the area that meet the criteria and register the potential buyer's interest in each house. Alternatively, the system may store the area information and periodically determine whether other potential buyers have registered an interest in houses in the same area or an area that overlaps in some way. The system can then determine if a house in the common area matches the criteria of multiple potential buyers and can notify the owner of the interest.

Figure 3:
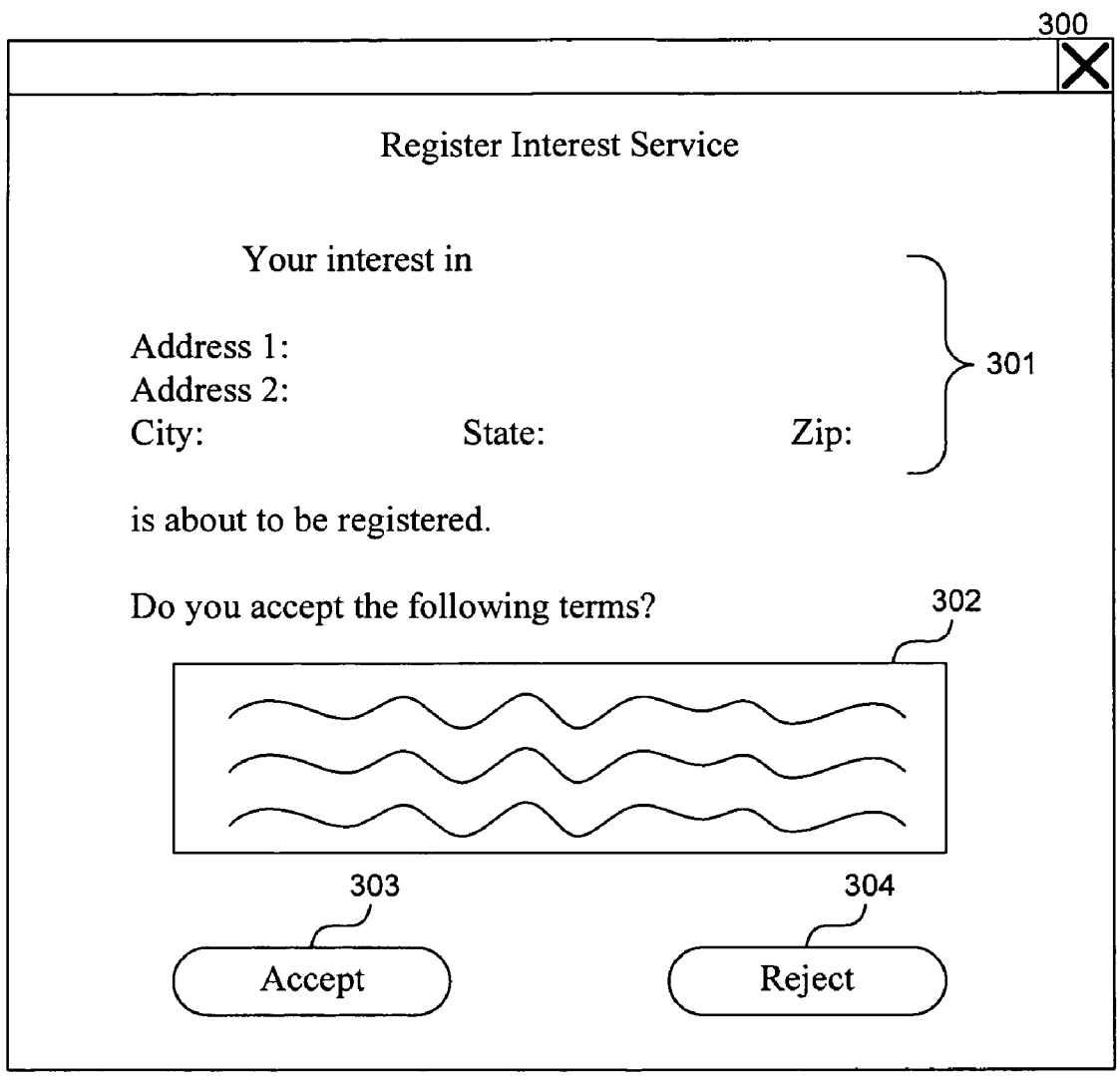
FIG. 3 is a display page that allows the potential buyer to register their interest in a house in one embodiment.

FIG. 3 is a display page that allows the potential buyer to register their interest in a house in one embodiment. A display page 300 includes an address confirmation area 301, a terms area 302, an accept button 303, and a reject button 304. The register interest system displays the display page when a potential buyer wants to register an interest in a house. The address confirmation area displays the address of the house, which may have been identified by the potential buyer by entry of the address, search using a map, and so on. The terms area outlines the terms under which the potential buyer's interest in the house will be registered by the register interest system. The potential buyer can select either the accept button or the reject button to accept or reject the terms. The register interest service may send a letter via regular post to the home address of the potential buyer providing a confirmation code of the registration. The letter may direct the potential buyer to enter the confirmation code at the register interest service's web site within a certain time and/or make an online payment to the register interest system. If the potential buyer does not enter the confirmation code or make the payment, then the register interest service may unregister the potential buyer's interest in that house. Such confirmation may help confirm that the potential buyer has a serious interest in the house. Also, the system can use the knowledge of the potential buyer's home address to help determine whether the potential buyer is qualified to purchase the house. For example, the system may access public records to determine who owns the house and the house's assessed value.

FIG. 4 is a display page that allows a potential buyer to view the list of houses in which the potential buyer has registered an interest in one embodiment. A display page 400 includes a link 401-402 for each house in which the potential buyer has registered an interest. A link may identify a house by a street address. The potential buyer may review more detailed information about the house by selecting a link. The register interest system may also display a map that highlights the houses in which the potential buyer has registered an interest. When the user selected a highlighted house on the map, the register interest system displays more detailed information about the house.

Figure 5:
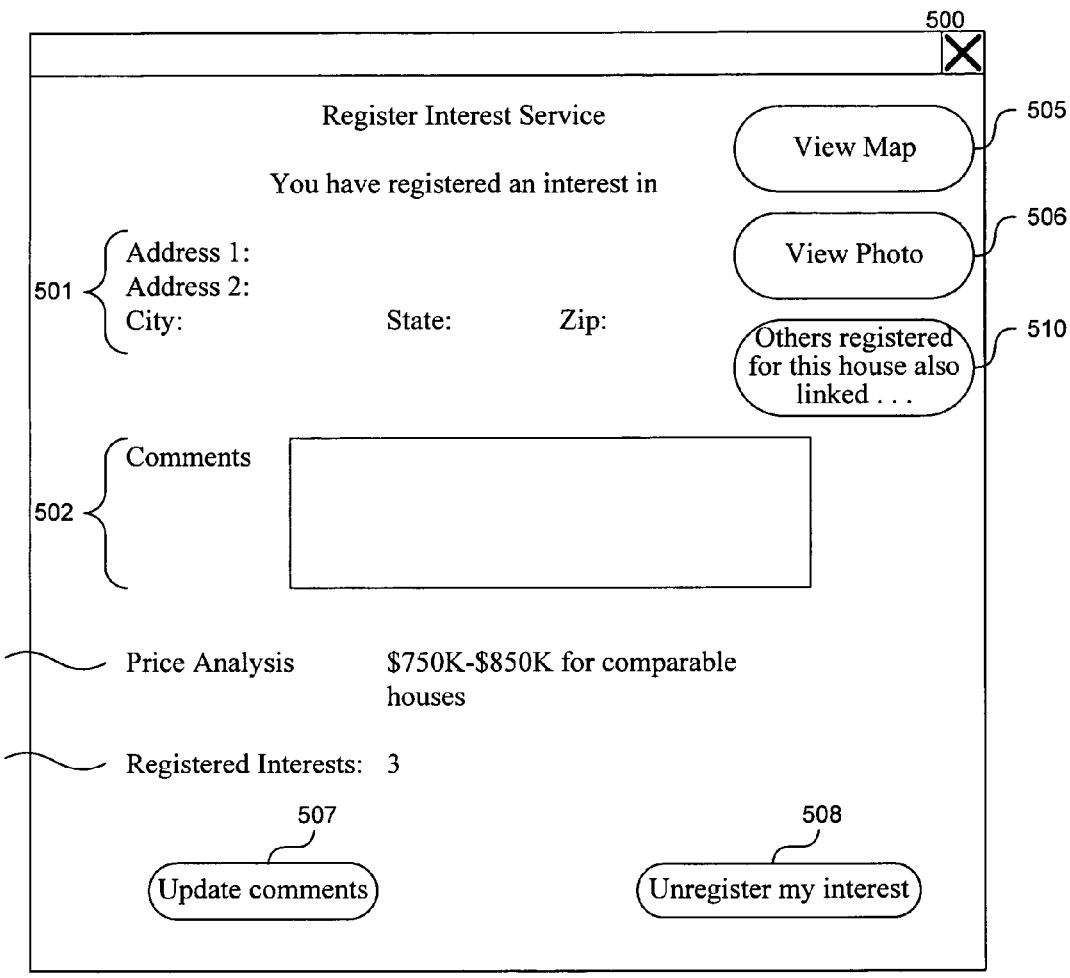
FIG. 5 is a display page that allows a potential buyer to view more detailed information about a house in which the potential buyer has registered an interest in one embodiment.

FIG. 5 is a display page that allows a potential buyer to view more detailed information about a house in which the potential buyer has registered an interest in one embodiment. The display page 500 includes an address area 501, a comments area 502, a price analysis area 503, a registered interests area 504, a view map button 505, and a view photo button 506. The address area contains the address of the house in which the potential buyer has registered an interest. The potential buyer can enter information in the comments area to help track their interest in the house. For example, the potential buyer may add a comment that the house has an extra large garage or a great view of a mountain range. The register interest system may analyze recent sale prices of houses that are determined to be comparable and display their price range in the price analysis area. The registered interests area may indicate the number of other potential buyers who have registered an interest in the house. The potential buyer can select the view map button to view a map of the area in which the house is located. The potential buyer can select the view photo button to view a photograph of the house. The photograph of the house may have been uploaded by the owner of the house or may have been taken by and uploaded by the register interest service. The potential buyer selects an update comments buttons 507 to update the comments. The potential buyer selects an unregister my interest button 508 to unregister their interest in the house. The display page may also include a button 510 to show houses in which others who registered interest in this house also registered an interest. Thus, the system is able to recommend houses that may be of interest to the potential buyer by correlating his own registered interests with the registered interests of other potential buyers. This recommendation could be further qualified by other factors such as the location of the homes (e.g., restricted to a particular neighborhood) in which the potential buyer has registered an interest.

Figure 6:
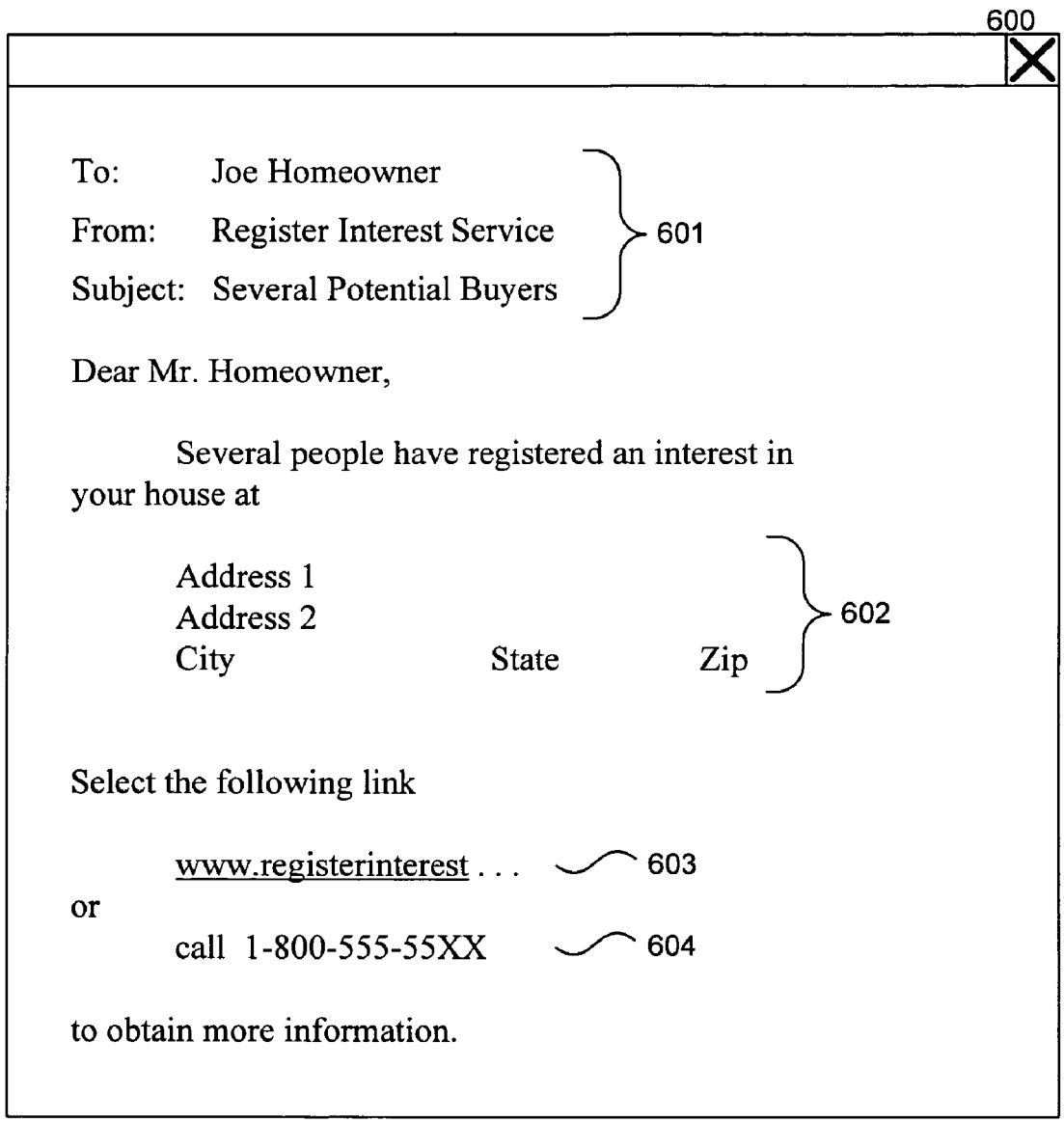
FIG. 6 is a display page that illustrates an electronic mail message sent to an owner of a house in which one or more potential buyers have registered an interest in one embodiment.

FIG. 6 is a display page that illustrates an electronic mail message sent to an owner of a house in which one or more potential buyers have registered an interest in one embodiment. An electronic mail message 600 includes header information 601, an address confirmation area 602, a register interest link 603, and a telephone number 604. The header information identifies the recipient, sender, and subject of the electronic mail message. The address confirmation area includes the address of the house for which the owner is being notified of the registered interest. The register interest link is a link to a web page of the register interest service. When the owner selects the link, the register interest system provides a web page that may explain the register interest service and allow the owner to create an account with the register interest service. The owner may call the telephone number to obtain information about the register interest service, rather than accessing the web page. Alternatively, the register interest service may send a letter via regular post to a house address that contains similar information to the electronic mail message. The register interest service may identify the owner of the house using available data sources such as online databases provided by various governmental entities (e.g., county tax records).

Figure 7:
FIG. 7 is a display page that allows an owner to register their house with the register interest system in one embodiment.

FIG. 7 is a display page that allows an owner to register their house with the register interest system in one embodiment. After an owner establishes an account with the register interest service, the owner may wish to register their house so that the register interest system can more easily notify the owner when potential buyers have registered an interest in their house. Even though an owner is not currently interested in offering their house for sale, by registering their interest an owner may be indicating that they would entertain selling their house if the price was right. A display page 700 includes an address area 701, an alert checkbox 702, an add detailed information button 703, and a submit button 704. The owner of the house enters the address of the house in the address area. The owner may select the alert check box to indicate that the owner wants to receive electronic mail alerts when a potential buyer has registered an interest in their house. The owner selects the add detailed information button to provide more detailed information about their house. For example, the owner may upload a photograph of the house, provide comments on the interior of the house, and so on. The owner selects a submit button to register their house with the register interest system.

FIG. 8 is a display page provided to an owner when the owner visits the register interest system after being notified of potential buyers' interest in one embodiment. A display page 800 provides instructions on how the owner can learn the identity of the potential buyers. The register interest system may require the owner to establish an account with the register interest service and agree to various terms (e.g., fee and confidentiality) before being provided with the identification of the potential buyers.

Figure 9:
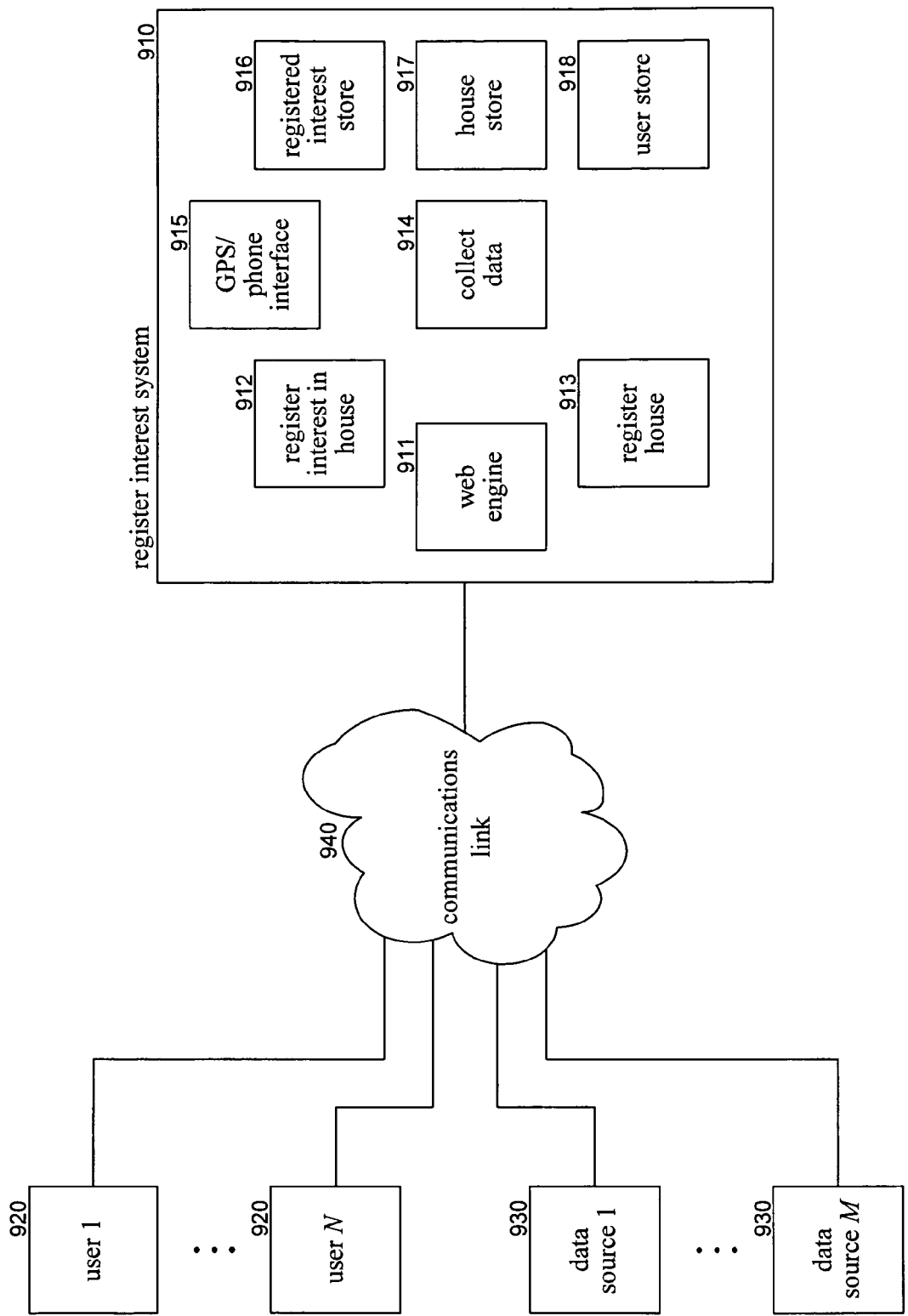
FIG. 9 is a block diagram that illustrates components of the register interest system in one embodiment.

FIG. 9 is a block diagram that illustrates components of the register interest system in one embodiment. The register interest system 910 is connected to various user computer systems 920 and various data sources 930 through a communications link 940. The register interest system includes a web engine 911, a register interest in house component 912, a register house component 913, a collect data component 914, and a GPS/phone interface component 915. The register interest system also includes a registered interest store 916, a house store 917, and a user store 918. The web engine receives requests for web pages, invokes the register interest in house component or the register house component to generate the responsive web pages, and responds with the web pages. The register interest in house component provides the web pages through which a potential buyer can register their interest in a specific house. The register house component provides the web pages through which the owner of a house can register their house with the register interest system. The collect data component collects information from various data sources and stores it in the data stores of the register interest system. For example, the collect data component may retrieve map information, tax information, ownership information, sales history, house descriptions, and so on from a data source. The GPS/phone interface component provides an interface through which potential buyers can register an interest in a house using a telephone. For example, if a cellular phone is GPS-enabled, then a potential buyer standing in front of a house of interest may call the register interest system. The register interest system can use the incoming call number to identify the potential buyer (assuming the potential buyer has previously established an account with the register interest service). The cellular phone can then upload the coordinates provided by the GPS system to the register interest system, and the register interest system can locate the house using information of the house store. The register interest system can then respond by enunciating the address of the house and prompt the potential buyer to confirm the registering of their interest in that house. In some embodiments, the register interest system can respond with a text or multimedia message to the phone (e.g., an SMS) or another predetermined destination (such as the potential buyer's email account). The house store contains an entry for each house in which a potential buyer has registered an interest. The house store may additionally contain an entry for each house in an area that is serviced by the register interest service. The user store contains an entry for each potential buyer and owner who has established an account with the register interest service. The registered interest store contains a mapping between potential buyers from the user store and houses from the house store in which the potential buyers have registered an interest.

The computing device on which the register interest system is implemented may include a central processing unit, memory, input devices (e.g., keyboard and pointing devices), output devices (e.g., display devices), and storage devices (e.g., disk drives). The memory and storage devices are computer-readable media that may contain instructions that implement the register interest system. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

The register interest system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 10:
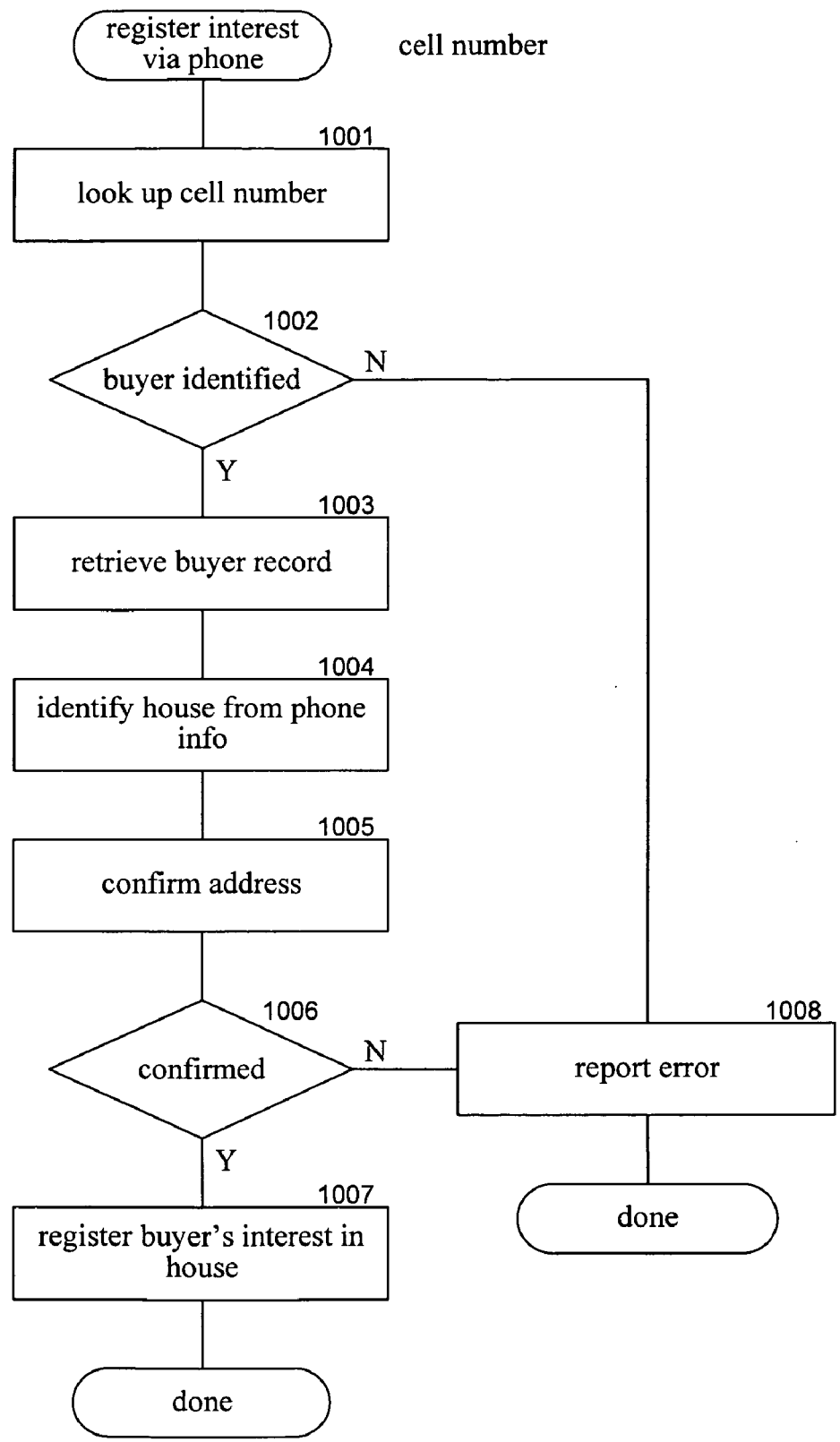
FIG. 10 is a flow diagram that illustrates a component that allows an interest in a house to be registered via telephone in one embodiment.

FIGS. 10-14 are flow diagrams that illustrate various functions that may be performed by some embodiments of the register interest system in one embodiment. FIG. 10 is a flow diagram that illustrates a component that allows an interest in a house to be registered via telephone in one embodiment. The component is passed the cellular telephone number that is currently placing a call to the register interest system. In block 1001, the component looks up the telephone number in the user store to identify the potential buyer. In decision block 1002, if the potential buyer is identified, then the component continues at block 1003, else the component continues at block 1008. In block 1003, the component retrieves the potential buyers entry from the user store. In block 1004, the component identifies the house from information provided via the telephone. That information may include the GPS coordinates, the potential buyer speaking the address of the house, or a photograph of the house that has been uploaded by the cellular phone. The component may use an image recognition system to identify the house from photographs of houses that are stored by the register interest system. In block 1005, the component responds to the potential buyer with the address of the identified house and requests the potential buyer to confirm the address. In decision block 1006, if the potential buyer confirms the address, then the component continues at block 1007, else the component continues at block 1008. In block 1007, the component registers the potential buyer's interest in the house and then completes. In block 1008, the component reports an error and then completes.

Figure 11:
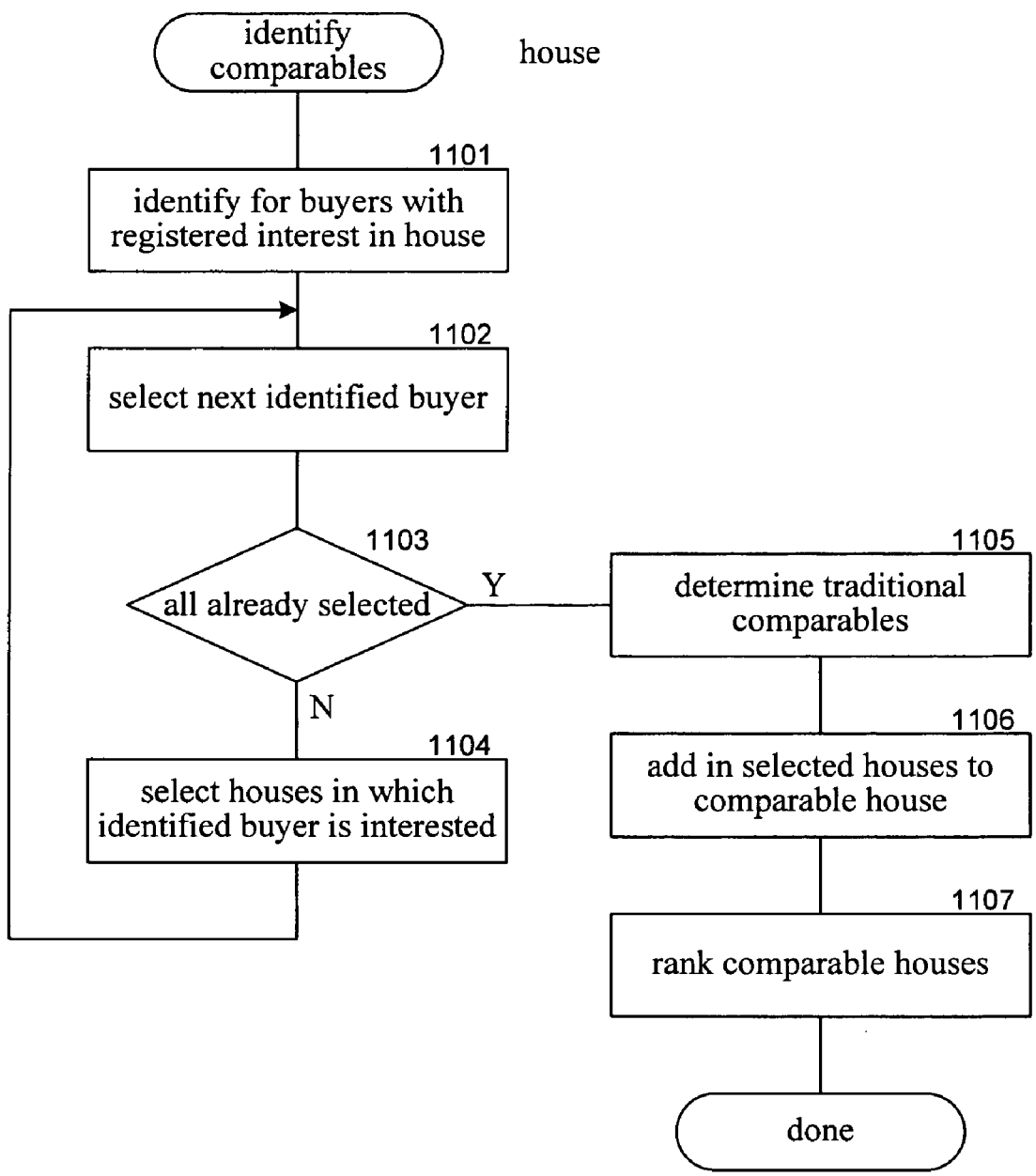
FIG. 11 is a flow diagram that illustrates a component that identifies comparable houses in one embodiment.

FIG. 11 is a flow diagram that illustrates a component that identifies comparable houses in one embodiment. The component is passed an indication of a house for which comparables are to be identified. In block 1101, the component identifies the potential buyers who have registered an interest in the house. In blocks 1102-1104, the component loops identifying the other houses in which the potential buyers have registered an interest. In block 1102, the component selects the next identified potential buyer. In decision block 1103, if all the identified potential buyers have already been selected, then the component continues at block 1105, else the component continues at block 1104. In block 1104, the component selects the houses in which the selected potential buyer has registered an interest. The component then loops to block 1102 to select the next identified potential buyer. In block 1105, the component determines the comparable houses using traditional techniques. In block 1106, the component adds the selected houses to the comparable houses determined by the traditional techniques. In block 1107, the component scores and ranks the comparable houses. The component may generate a score based on how well a comparable house matches the selected house using a traditional scoring technique (e.g., bedrooms, lot size, and age). The component may then adjust the scores based on the registered interest of the identified potential buyers. The component then completes.

Figure 12:
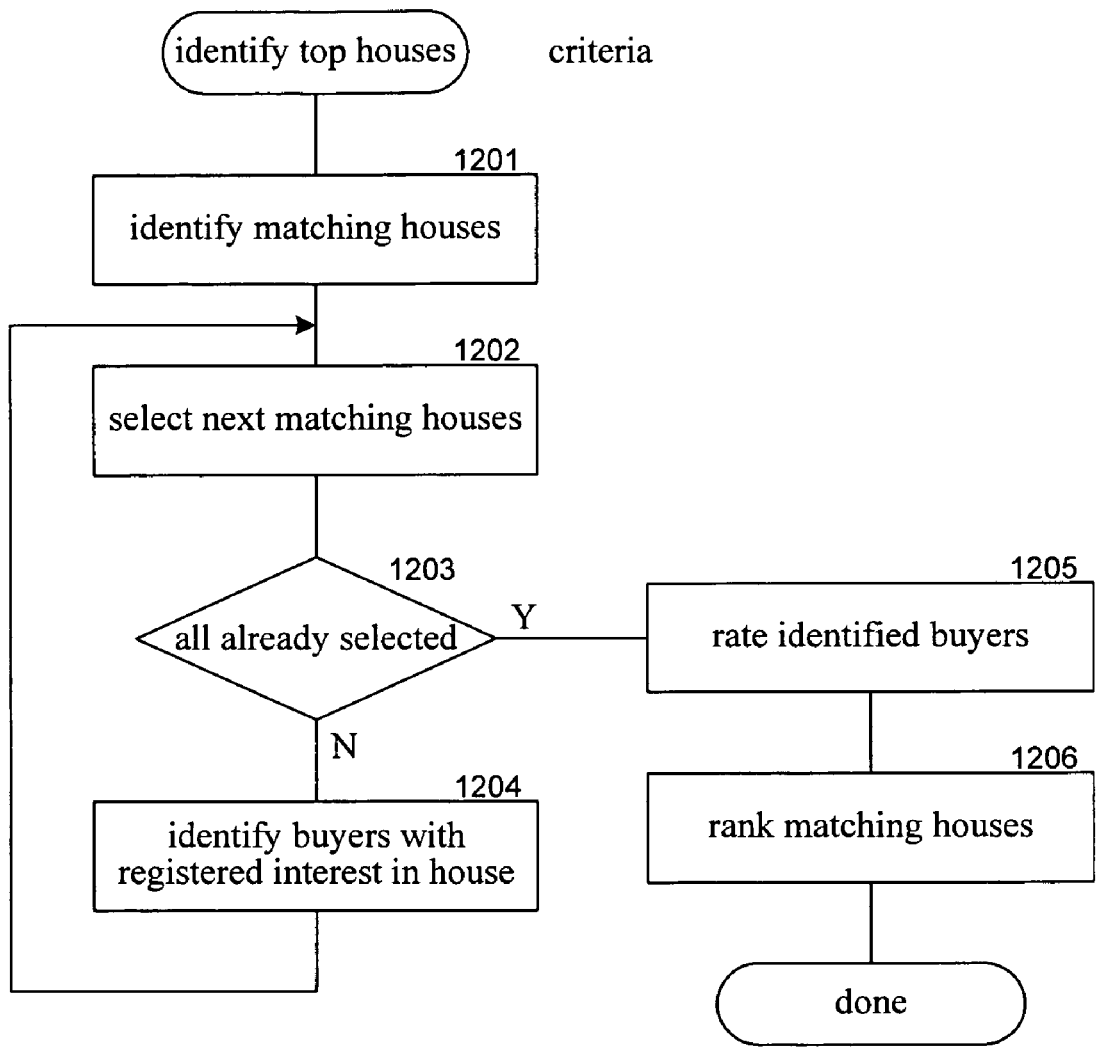
FIG. 12 is a flow diagram that illustrates a component that identifies top houses in an area.

FIG. 12 is a flow diagram that illustrates a component that identifies top houses in an area. The component is passed criteria (e.g., price range, bedrooms, and neighborhood) and identifies the top houses that match the criteria. In block 1201, the component identifies the houses that match the criteria. In blocks 1202-1204, the component loops identifying the potential buyers for the identified matching houses. In block 1202, the component selects the next matching house. In decision block 1203, if all the matching houses have already been selected, then the component continues at block 1205, else the component continues at block 1204. In block 1204, the component identifies the potential buyers who have registered an interest in the selected house and then loops to block 1202 to select the next matching house. In block 1205, the component rates the identified potential buyers. The rating may factor in potential buyers' financial capability to buy houses in which they have registered an interest, the number of houses in which a potential buyer has registered an interest (i.e., a potential buyer who has registered an interest in only one house may be rated higher than a potential buyer who has registered an interest in 10 houses). In block 1206, the component ranks the matching houses based on the rating of the identified potential buyers and how well the house matches the criteria. The component then completes.

Figure 13:
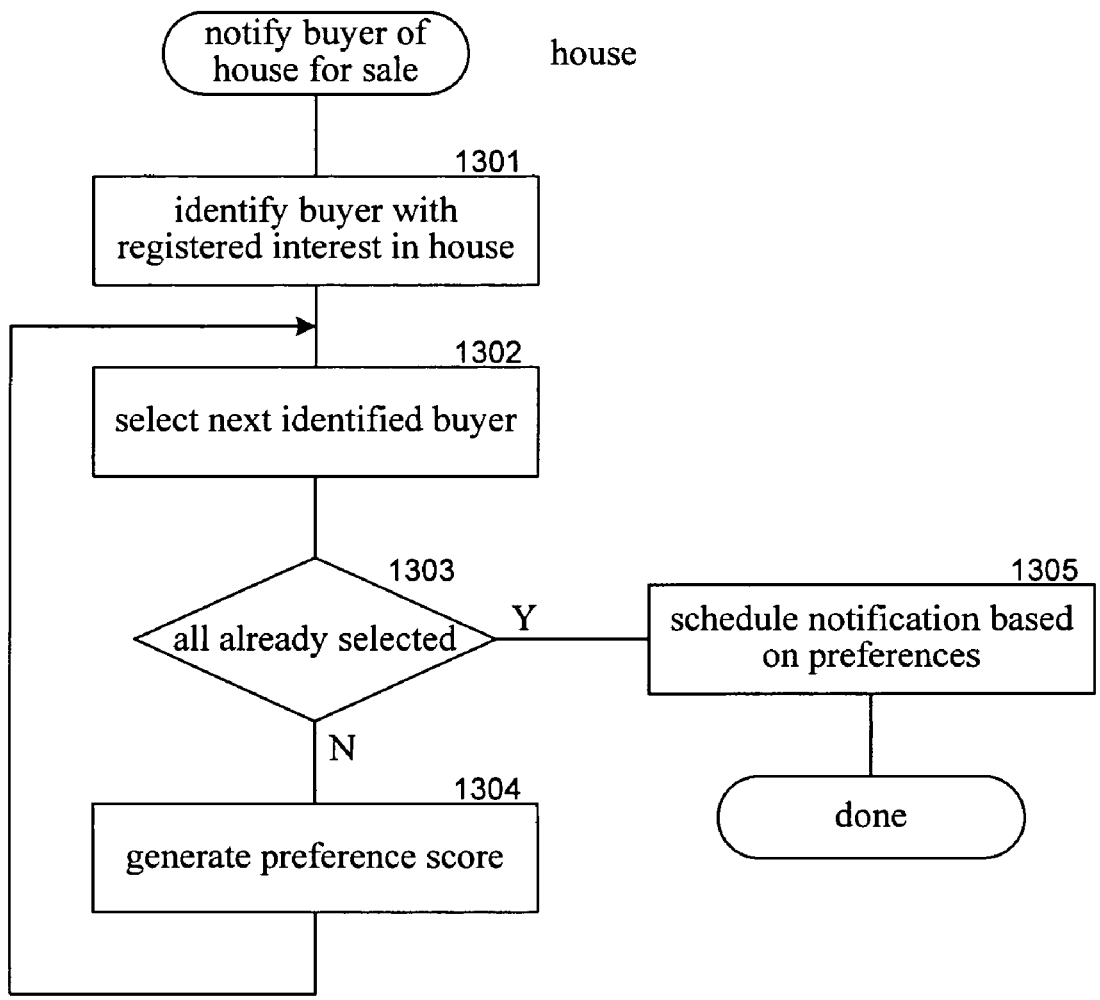
FIG. 13 is a flow diagram that illustrates a component that notifies a potential buyer when a house in which they have registered an interest becomes available for sale in one embodiment.

FIG. 13 is a flow diagram that illustrates a component that notifies a potential buyer when a house in which they have registered an interest becomes available for sale in one embodiment. The component is passed an indication of the house. In block 1301, the component identifies the potential buyers who have registered an interest in the house. In blocks 1302-1304, the component loops generating a preference score for each identified potential buyer. The preference score may indicate the order and timing for providing the names of the potential buyers to the owner of the house. A potential buyer who has paid a fee for registering their interest or who was first to register an interest in the house may be given a first opportunity to negotiate with the owner. In block 1302, the component selects the next identified potential buyer. In decision block 1303, if all the identified potential buyers have already been selected, then the component continues at block 1305, else the component continues at block 1304. In block 1304, the component generates a preference score for the selected potential buyer and loops to block 1302 to select the next identified potential buyer. In block 1305, the component schedules the notification of the potential buyers to the owner based on their preferences. The component then completes.

Figure 14:
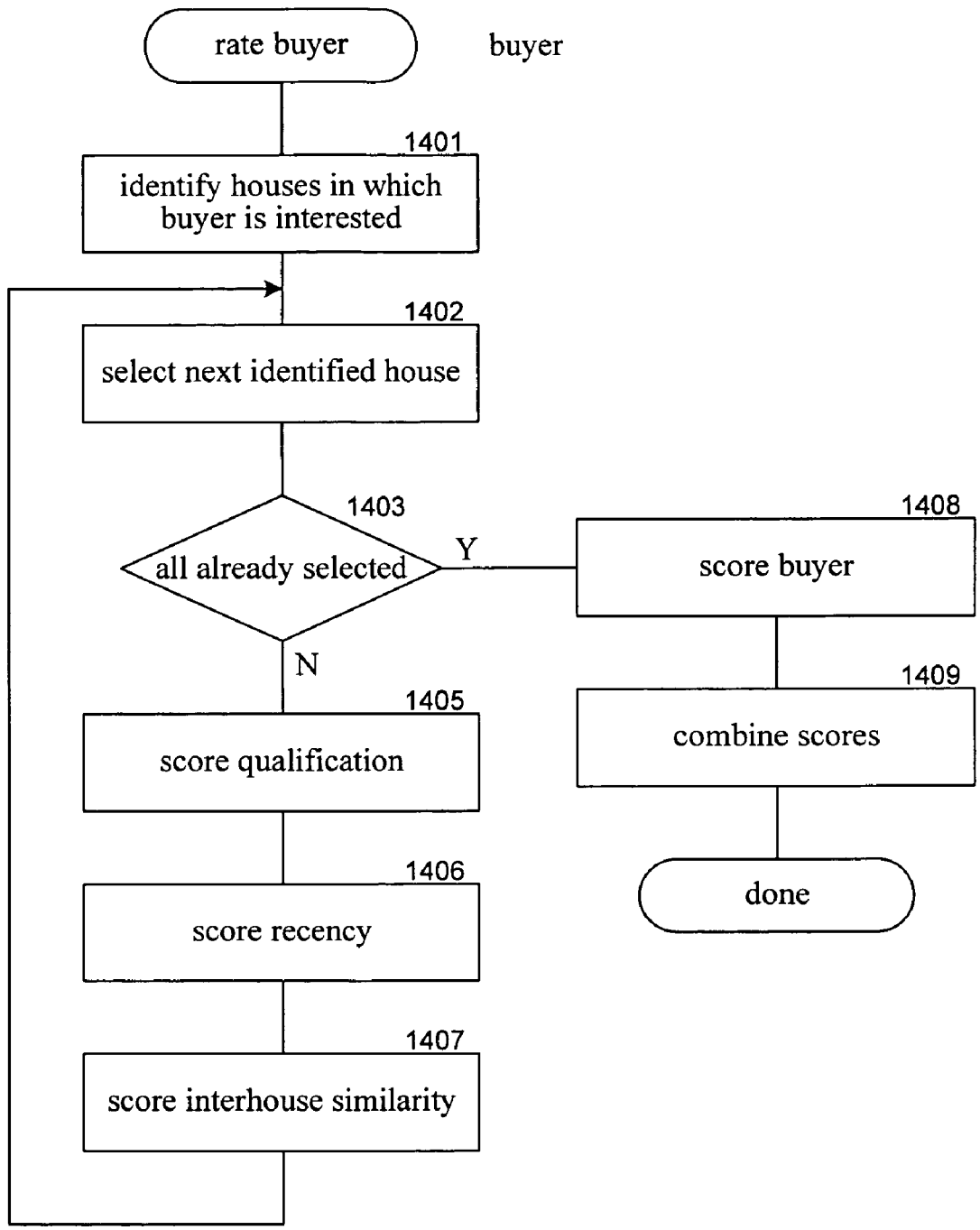
FIG. 14 is a flow diagram that illustrates a component that rates potential buyers in one embodiment.

FIG. 14 is a flow diagram that illustrates a component that rates potential buyers in one embodiment. The component is passed an indication of a potential buyer and generates a score indicating the likelihood that the potential buyer has a real interest in, and/or is financially capable of, buying a house. In block 1401, the component identifies the houses in which the potential buyer has registered an interest. In blocks 1403-1407, the component loops generating various scores for each house in which the potential buyer has registered an interest. In block 1402, the component selects the next house in which the potential buyer has registered an interest. In decision block 1403, if all the houses have already been selected, then the component continues at block 1408, else the component continues at block 1405. In block 1405, the component generates a score indicating the extent to which the potential buyer is qualified to buy the selected house. In block 1406, the component generates a score based on how recently the potential buyer has registered or confirmed their interest in the selected house. In block 1407, the component generates an interhouse similarity score that indicates how similar the selected house is to the other identified houses. If a potential buyer registers an interest in houses with very different characteristics, then the potential buyer may not be serious. The component then loops to block 1402 to select the next identified house. In block 1408, the component generates a score for the potential buyer that may factor in employment history, credit history, and so on. In block 1409, the component combines the generated scores to generate an overall score for the potential buyer. The component may use a weighting factor for each of the scores used to generate the overall score. The component then completes.

Figure 15:
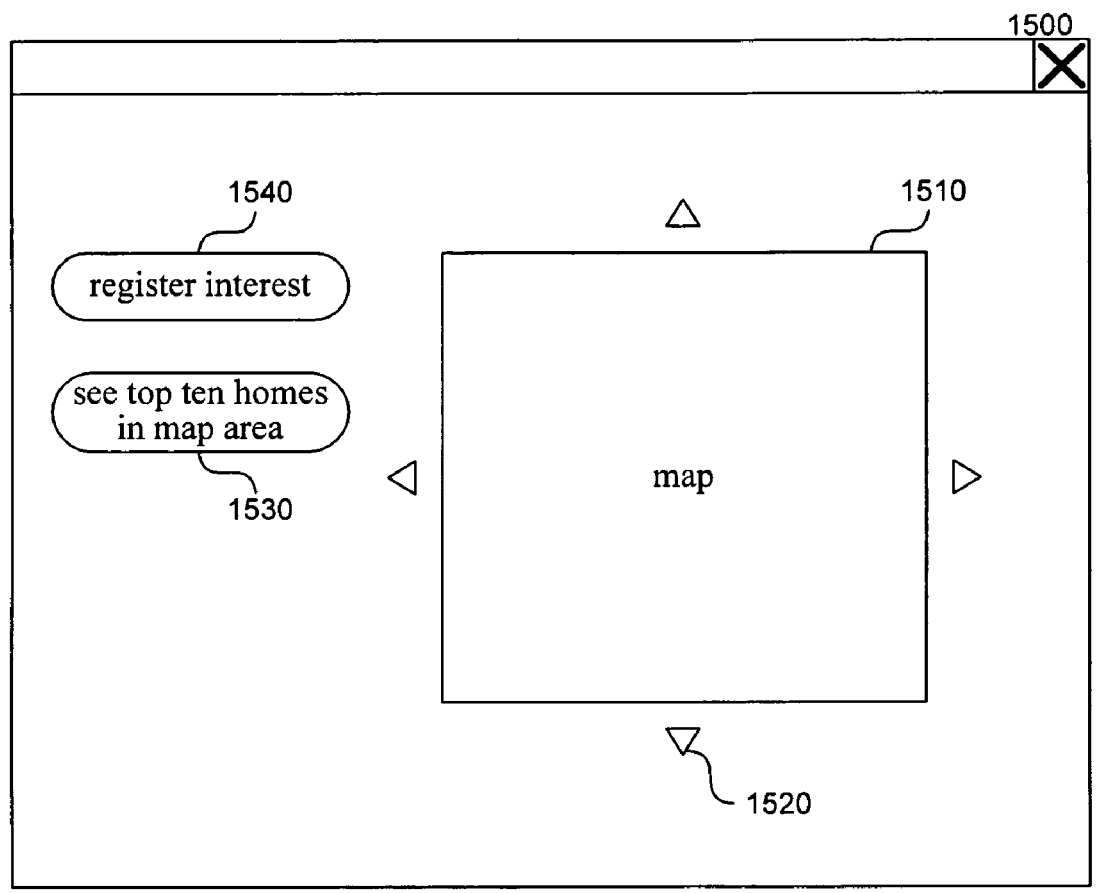
FIG. 15 illustrates a display page that allows a potential buyer to select a region and view information about the homes in that region.

FIG. 15 illustrates a display page that allows a potential buyer to select a region and view information about the homes in that region. In some embodiments, a display page 1500 has a map 1510. The map can be a satellite-photo map, a traditional street map, or any other suitable type of map. The potential buyer can use the navigation arrows 1520 to display regions in which the potential buyer would like to purchase a house. The potential buyer can select any house on the map and obtain information on that house and the neighborhood (e.g., via a web page). If the map shows a house in which the buyer has registered interest, the map may also highlight other houses in which the potential buyer may be interested based on registration of other potential buyers who have also registered interest in the same house. The display page includes a button 1530 that will cause the system to display information about the homes in the map region that have attracted the most pre-listing interest. For example, when a user navigates the map to display a particular neighborhood, pressing button 1530 may cause icons representing the top ten homes that have accumulated the most pre-listing interest to be displayed on the map. When the potential buyer selects an icon, the system displays information (e.g., via a web page) about the home that the icon represents. After a potential buyer has selected a house on the map, the potential buyer can register their interest in the select house by selecting the register interest button 1540.

Figure 16:
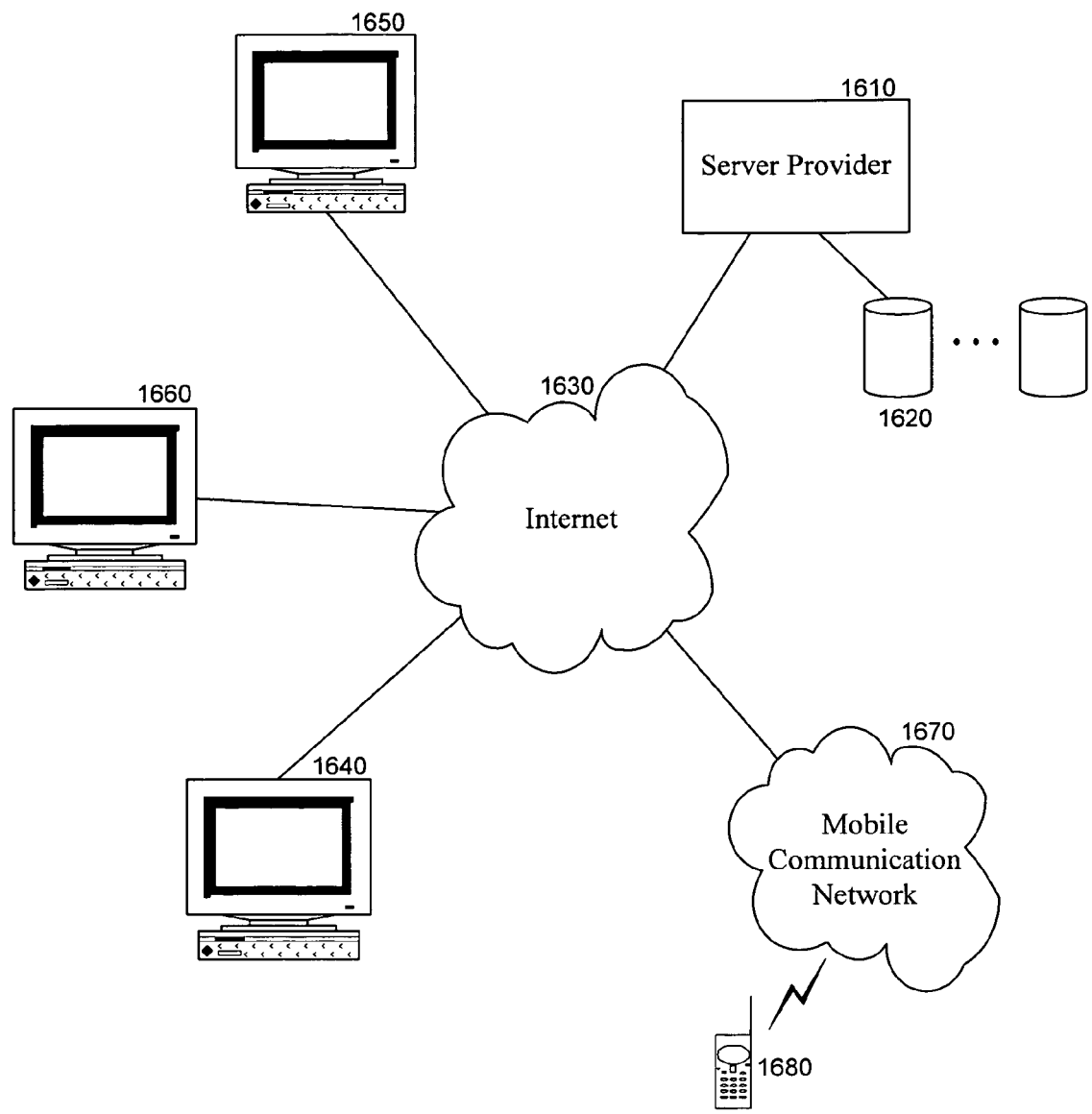
FIG. 16 is a block diagram of one embodiment of a system for implementing the register interest system.

FIG. 16 is a block diagram of one embodiment of a system for implementing the register interest system. A service provider system 1610 provides display pages via the Internet 1630. Potential buyers via their computing devices 1640 can use the display pages to indicate interest in purchasing a house that is not currently for sale. The service provider system accesses databases 1620 to store and retrieve information about the potential purchaser, properties in which the potential purchaser has expressed interest, and other information of the register interest service. Potential sellers via their computing devices 1650 can use the display pages to investigate registered interest in their house. The service provider may also provide the potential buyer and the potential seller with referrals to real estate agents, brokers, lawyers, lenders, and inspectors, collectively who use their own computing devices 1660.

Potential buyers, and others, may also communicate with the service provider system by mobile communication devices 1680. Mobile devices may access the service provider via a mobile communication network 1670 and the Internet 1630. In one alternative, the potential buyer can access the service provider system via the mobile communication network and the public switched telephone network (not shown for clarity). For example, the potential buyer may notice a house that the potential buyer would like to purchase. As discussed previously, the potential buyer places a call or sends a text message to the service provider system to register their interest in purchasing the house. The service provider system can use the location of mobile device as further information to confirm identification of the house in which the potential buyer wants to register an interest.

Figure 17:
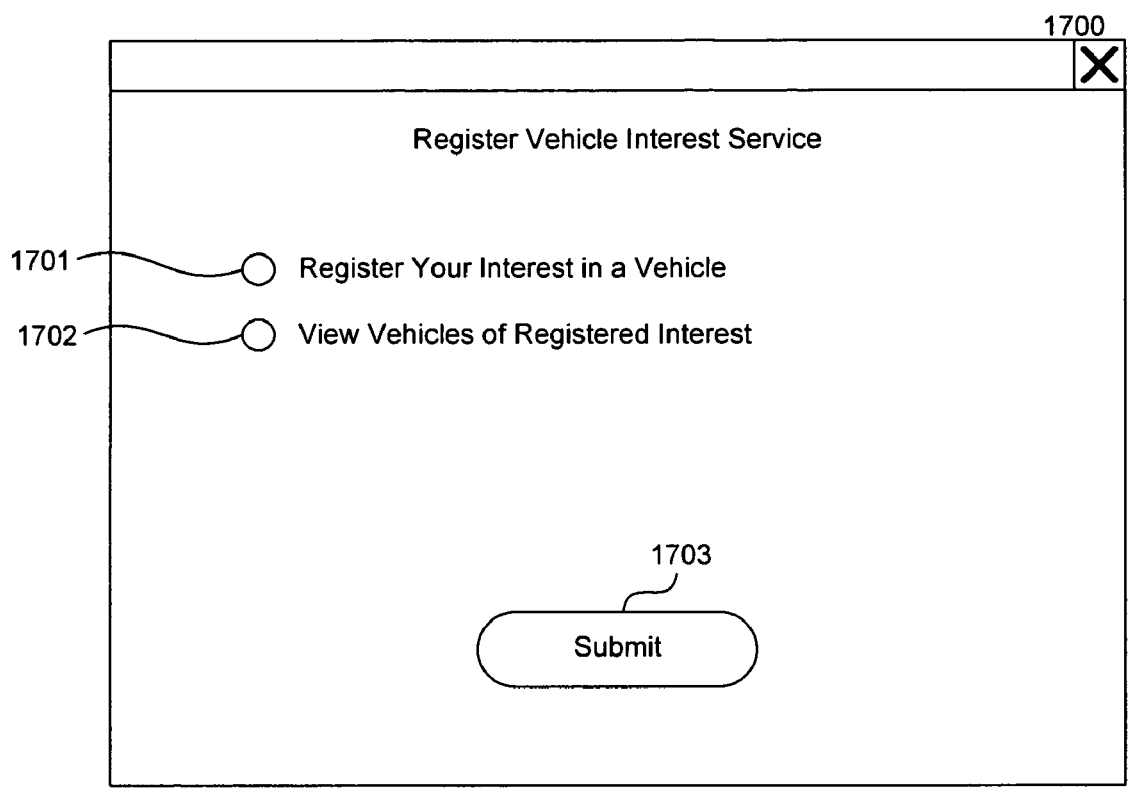
FIG. 17 is a display page that allows a potential buyer to select various options of the register vehicle interest system in one embodiment.

FIG. 17 is a display page that allows a potential buyer to select various options of the register vehicle interest system in one embodiment. A display page 1700 is presented to a potential buyer who has an account with the register vehicle interest system. The display page includes a register your interest in a vehicle option 1701 and a view vehicles of registered interest option 1702. The user selects one of the options and then selects the submit button 1703 to perform the selected option. FIG. 17 is analogous to FIG. 1 for registering interest in houses.

FIG. 18 is a display page that allows a potential buyer to identify a vehicle in which the potential buyer wants to register an interest in one embodiment. A display page 1800 is presented to a potential buyer who wants to register an interest in a vehicle. The display page includes a data entry area 1801 for entering the vehicle license plate number and a state drop-down list 1802 for selecting the state that issued the vehicle license plate. The potential buyer selects a submit button 1803 to submit the license plate number and state to the register vehicle interest system so that it can identify the specific vehicle. This display page may be adjusted to accommodate the conventional methods for uniquely identifying various vehicles. For example, a boat may be identified by a hull identification number.

FIG. 19 is a display page that provides detailed information about a vehicle and allows a potential buyer to register an interest in one embodiment. A display page 1900 includes a license plate number field 1901, a state field 1902, a make field 1903, a model field 1904, and a year field 1905. The plate number and state are provided by the potential buyer, and the make, model, and year are provided by the register vehicle interest system so that the potential buyer knows that the correct vehicle has been identified. The display page also includes a terms field 1906 that list the terms relating to registering the potential buyer's interest in this vehicle. The display page also includes an accept button 1907, a reject button 1908, and a wrong vehicle button 1909. A potential buyer selects the accept button to register an interest in this vehicle. A potential buyer selects the reject button to not have an interest registered. A potential buyer selects the wrong vehicle button to indicate that the register vehicle interest system has identified the wrong vehicle. The wrong vehicle may be identified, for example, when the potential buyer incorrectly recorded the license plate number, the vehicle had the wrong license plate (e.g., a stolen vehicle), and so on.

FIG. 20 is a display page that helps the potential buyer locate a vehicle of interest if detailed information on the uniquely identified vehicle cannot be located in one embodiment. A display page 2000 includes a vehicle unique identifier area 2001 and a vehicle description area 2002. The vehicle unique identifier area contains the license plate number and state specified by the potential buyer. The vehicle description area contains various fields in which the potential buyer can enter the description of the vehicle of interest. The display page includes a locate dealers button 2003, a locate private parties button 2004, and a locate both button 2005. A potential buyer selects the locate dealers button to locate vehicle dealers who have comparable vehicles for sale. A potential buyer selects the locate private parties button to locate private parties who have comparable vehicles for sale. A potential buyer selects the locate both button to select both dealers and private parties who may have comparable vehicles for sale.

Figure 21:
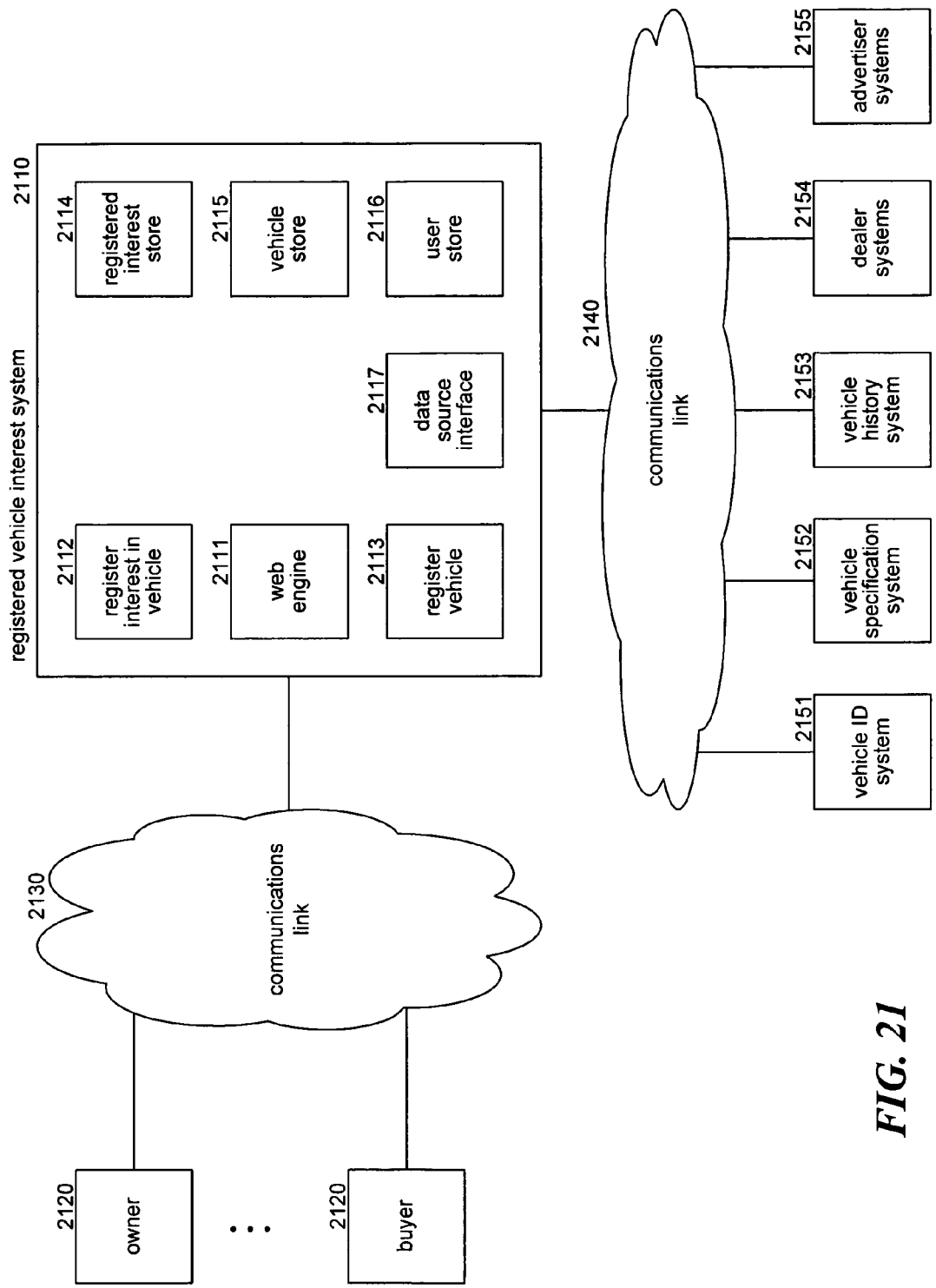
FIG. 21 is a block diagram that illustrates components of the register vehicle interest system in embodiment.

FIG. 21 is a block diagram that illustrates components of the register vehicle interest system in embodiment. The register vehicle interest system 2110 is connected to various user computer systems 2120 through communications link 2130 and to various data sources 2151-2155 through communications link 2140. The register vehicle interest system includes a web engine 2111, a register interest in vehicle component 2112, and a register vehicle component 2113. The register vehicle interest system also includes a registered interest store 2114, a vehicle store 2115, and a user store 2116. The web engine receives requests for web pages, invokes the register interest in vehicle component or the register vehicle component to generate the responsive web pages, and responds with the web pages. The register interest in vehicle component provides the web pages through which a potential buyer can register their interest in a specific vehicle. The register vehicle component provides the web pages through which the owner of a vehicle can register their vehicle with the register interest system. The register vehicle interest system includes a data source interface component 2117 to interface with the various data sources. The data sources may include a vehicle identification system 2151, a vehicle specification system 2152, a vehicle history system 2153, dealer systems 2154, and advertiser systems 2155. The advertiser systems may provide advertisements to be served by the register vehicle interest system. The register vehicle interest system may also include a mobile device interface through which potential buyers can register an interest in a vehicle using a mobile device. In the case of a cellular phone, the register vehicle interest system can use the incoming call number to identify the potential buyer (assuming the potential buyer has previously established an account with the register interest service). For example, a potential buyer who is traveling on a highway and spots a vehicle of interest may enter its license plate number and appropriate licensing governmental entity (e.g., state or country) via the mobile device. The register vehicle interest system can then allow the potential buyer to register an interest in the vehicle via their mobile device.

Figure 22:
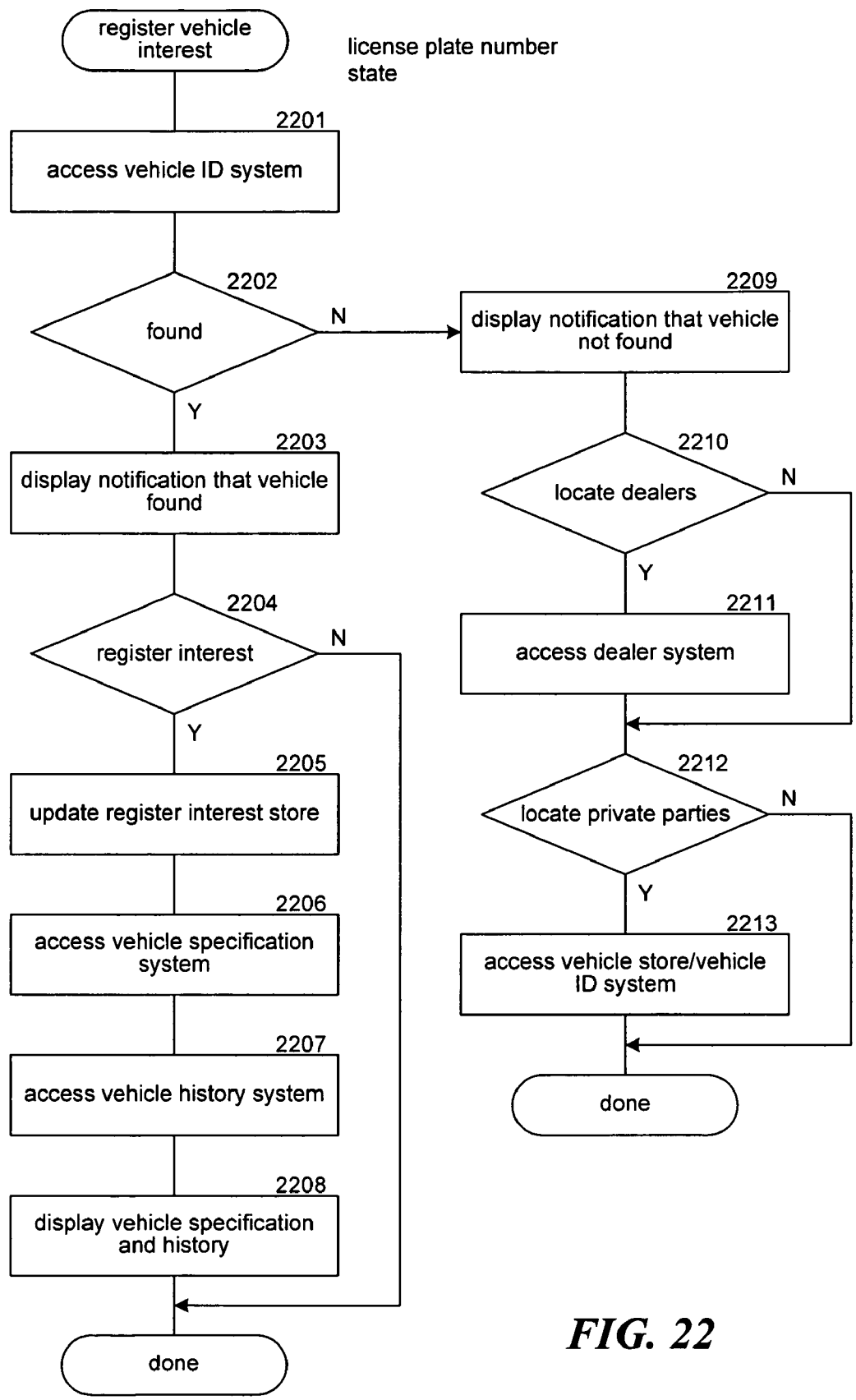
FIG. 22 is a flow diagram that illustrates the processing of the register vehicle interest component of the register vehicle interest system in one embodiment.

FIG. 22 is a flow diagram that illustrates the processing of the register vehicle interest component of the register vehicle interest system in one embodiment. The component is passed a unique identifier such as license plate number and state. In block 2201, the component accesses a vehicle identification system to retrieve detailed information about the vehicle. In decision block 2202, if detailed information is found, the component continues at block 2203, else the component continues at block 2209. In block 2203, the component displays to the potential buyer the detailed information about the vehicle. In decision block 2204, if the potential buyer indicates to register an interest in the vehicle, then the component continues at block 2205, else the component completes. In block 2205, the component updates the registered interest store to indicate the potential buyer's interest in the vehicle. In block 2206, the component accesses the vehicle specification system to retrieve the specifications for the vehicle. In block 2207, the component accesses a vehicle history system to retrieve the history of the vehicle. In block 2208, the component displays the vehicle specification and history to the potential buyer and then completes. Alternatively, the component may delay registering the potential buyer's interest in the vehicle until after the potential buyer has viewed the vehicle specification and history information. In block 2209, the component displays a notification that the vehicle was not found. In decision block 2210, if the potential buyer indicates to locate dealers, then the component continues at block 2211, else the component continues at block 2212. In block 2211, the component accesses the dealer systems to identify vehicles that are comparable to the description provided by the potential buyer and displays them to the potential buyer. In decision block 2212, if the potential buyer indicates to locate private parties, then the component continues at block 2213, else the component completes. In block 2213, the component accesses a vehicle store or other vehicle identification system to identify detailed information about comparable vehicles that may be for sale by private parties or potentially for sale by private parties. The component displays the detailed information to the user and then completes.

From the foregoing, it will be appreciated that specific embodiments of the register interest system have been described herein for purposes of illustration, but that various modifications may be made without deviating from the spirit and scope of the invention. One skilled in the art will appreciate that the register interest system may be used to acquire various rights in assets. For example, if the asset is a painting, then the potential acquirer may want limited copyrights in the painting. As another example, if the asset is an office building, the potential acquirer may want to lease space in the building. When an owner registers their house, the owner may be provided with a sign with an identification number. A potential buyer upon seeing the sign can use the identification number to register their interest in the house, for example, using a cellular telephone. The register interest service may also coordinate pre-marketing open houses for owners who have registered their house. The register interest service may invite potential buyers to the open house who have registered an interest in a comparable house. The register interest service may sell its registration information to mortgage companies to help them assess the risk associated with a house. If a house has traditionally had many registered potential buyers, then the mortgage company may be comfortable in lending to a somewhat risky buyer because of the many potential buyers should the risky buyer default. The register interest system may allow owners to correct the information about their house. For example, government records may not show the correct house size, number of bedrooms, and so on. Accordingly, the invention is not limited except as by the appended claims.

We claim:

1. A computer system for generating interest in a transaction between a potential buyer of a vehicle that is not currently on the market, and an owner of the vehicle, comprising:
 a memory storing computer-executable instructions of
  a component that provides a web page of a web site through which a potential buyer of a vehicle can register their interest in a specific vehicle that is not currently on the market, the web page providing a field for entry of a license plate number of a vehicle of interest, the license plate number having been assigned to the vehicle of interest by a governmental entity;
  a component that identifies a registered owner of the vehicle of interest by accessing information provided by an electronic database of the governmental entity that maps license plate numbers assigned to vehicles to the registered owners of the vehicles;
  a component that identifies a contact address of the registered owner of the vehicle of interest;
  a component that directs that a notification be sent to the registered owner of the vehicle of interest, the notification being addressed to the contact address and indicating that the potential buyer has registered an interest in the vehicle of interest;
  a component that provides a web page of a web site through which the registered owner of the vehicle of interest who has been notified can register an interest in offering for sale the vehicle of interest; and
  a component that directs that the potential buyer and the registered owner be put in contact after the registered owner registers an interest in offering for sale the vehicle of interest
  wherein the registered owner of a vehicle that is not currently on the market can be made aware of a potential buyer's interest in buying the vehicle without the vehicle being currently on the market; and
 a processor for executing the computer-executable instructions stored in the memory.

2. The computer system of claim 1 wherein the potential buyer and the owner are put in contact only after they agree to terms of contact.

3. The computer system of claim 1 including a component that provides to the potential buyer a history of the vehicle.

4. The computer system of claim 3 wherein the history includes repair and maintenance of the vehicle.

5. The computer system of claim 1 including a component that provides to the potential buyer a specification of the vehicle.

6. The computer system of claim 5 including a component that provides a list of vehicles that are comparable to the specific vehicle in which the potential buyer has registered an interest.

7. The computer system of claim 6 wherein a vehicle is comparable based at least in part on another potential buyer registering an interest in both the vehicle and the comparable vehicle.

8. A method performed by a computing device for generating interest in a transaction between a potential buyer of a vehicle that is not currently on the market and an owner of the vehicle, the method comprising:
 providing to a computer of a potential buyer of a vehicle a register purchase interest web page through which the potential buyer registers interest in purchasing a specific vehicle that is not currently on the market by entering a vehicle license plate number and state of registration of the vehicle, the vehicle license plate number being assigned to the vehicle by a governmental entity of the state of registration of the vehicle;
 receiving from the computer of the potential buyer via the register purchase interest web page the vehicle license plate number and the state of registration of a vehicle of interest;
 upon receiving the vehicle license plate number and the state of registration of the vehicle of interest,
  accessing a vehicle identification system of the governmental entity to locate information on the vehicle of interest that is identified by the received license plate number and state of registration, the located information including information describing the vehicle and contact information of the owner of the vehicle;
 providing to the computer of the potential buyer a confirmation web page displaying information describing the vehicle and requesting the potential buyer to confirm that the described vehicle is the vehicle of interest; and upon receiving confirmation that the described vehicle is the vehicle of interest, directing the sending of a notification to the owner of the vehicle based on the contact information, the notification indicating that the potential buyer has expressed an interest in purchasing the owner's vehicle, the notification directing the owner to a register sale interest web page through which the owner can register an interest in offering the owner's vehicle for sale;

providing to a computer of the owner the register sale interest web page; and after receiving an indication via the register sale interest web page that the owners is interested in offering their vehicle for sale, providing contact information to the potential buyer and the owner so that the potential buyer and the owner are made aware of each other's interest in a sales transaction for the vehicle of interest.

9. The method of claim 8 wherein the license plate number is received via a mobile device.

10. The method of claim 9 wherein the mobile device is a telephone and a potential buyer dials a telephone number and enters the license plate number of the vehicle along with the state of registration of the vehicle.

11. The method of claim 8 including providing to the computer of the potential buyer a web page with a list of vehicles that are comparable to the vehicle in which the potential buyer has registered an interest.

* * * * *